United States Patent
Shimizu et al.

(10) Patent No.: US 6,338,574 B1
(45) Date of Patent: Jan. 15, 2002

(54) BEARING MECHANISM, HARD DISK DRIVE MECHANISM AND POLYGON MIRROR DRIVE MECHANISM USING THE BEARING MECHANISM, AND METHOD FOR MANUFACTURING HERRINGBONE GROOVE PORTIONS OF DYNAMIC-PRESSURE BEARING

(75) Inventors: Narito Shimizu, Nagoya; Makio Kato, Mie; Tatsuo Hisada, Tokoname; Jun Yatazawa, Tokai, all of (JP)

(73) Assignee: Daido Tokushuko Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/492,832

(22) Filed: Jan. 27, 2000

(30) Foreign Application Priority Data

Jan. 27, 1999 (JP) ............................................. 11-019129
Feb. 4, 1999 (JP) ............................................. 11-027467
Apr. 8, 1999 (JP) ............................................. 11-101706

(51) Int. Cl.$^7$ ................................................. F16C 17/02
(52) U.S. Cl. ........................................ 384/115; 384/114
(58) Field of Search ................................ 384/115, 114, 384/119, 113, 107

(56) References Cited

U.S. PATENT DOCUMENTS 4,182,720 A * 1/1980 Zacherl

FOREIGN PATENT DOCUMENTS

JP          5-215128      8/1993
JP          11-27896      1/1999

OTHER PUBLICATIONS

Japanese Patent Office, *Patent Abstracts of Japan*, Publication No. 05215128, Publication Date: Aug. 24, 1993.
Japanese Patent Office, *Patent Abstracts of Japan*, Publication No. 11027896, Publication Date: Jan. 29, 1999.

* cited by examiner

Primary Examiner—Lenard A. Footland
(74) Attorney, Agent, or Firm—Snider & Associates; Ronald R. Snider

(57) ABSTRACT

A bearing mechanism eliminates the need for lubricating oil, is capable of generating enough radial dynamic pressure even in lower-speed regions, and yet can be easily surface-machined for the generation of radial dynamic pressure and manufactured with low cost. In at least either one of an outer circumferential surface $2a$ of a first member 2 or an inner circumferential surface $3a$ of a second member 3 (hereinafter, referred to as roughened surface), the two circumferential surfaces being opposed to each other with a bearing gap G therebetween, dot-like minute dips and bumps are formed dispersedly, by which the surface is roughened so that its center-line mean roughness is controlled within a range of 0.1 $\mu$m–1.0 $\mu$m. With this arrangement, since enough radial dynamic pressure can be generated at a relatively low rotational speed, time duration of a dynamic-pressure insufficiency upon a start-up or halt of the rotating mechanism is shortened so that members in the bearing part can be made less liable to wear.

14 Claims, 15 Drawing Sheets

BEARING MECHANISM, HARD DISK DRIVE MECHANISM AND POLYGON MIRROR DRIVE MECHANISM USING THE BEARING MECHANISM, AND METHOD FOR MANUFACTURING HERRINGBONE GROOVE PORTIONS OF DYNAMIC-PRESSURE BEARING

RELATED APPLICATIONS

This application claims the priority of Japanese Patent Applications No.11-19129 filed on Jan. 27, 1999, No.11-27467 filed on Feb. 4, 1999 and No.11-101706 filed on Apr. 8, 1999 which are incorporated herein by reference.

BACKGROUND OF THE INVENTION

The present invention relates to a bearing mechanism, a hard disk drive mechanism and a polygon mirror drive mechanism using the bearing mechanism, and a method for forming herringbone groove portions of a dynamic-pressure bearing, more specifically, a method for forming herringbone groove portions on a bearing shaft or bearing sleeve of a dynamic-pressure bearing.

Conventionally, for example in hard disk drive mechanisms of storage devices, polygon mirror drive mechanisms of copying machines or laser printer devices and the like, dynamic-pressure bearings have often been adopted in order to achieve rotations accompanied by less swaying-rotations. As such a dynamic-pressure bearing, there has been known one, for example as shown in Japanese Patent Laid-Open Publication HEI 5-215128, in which a rotating shaft is inserted inside a cylindrical-shaped bearing member while, for example, herringbone-shaped dynamic-pressure generating grooves are formed circumferentially in the outer circumferential surface of the rotating shaft. In this structure, when the rotating shaft is rotated at high speed inside the bearing member, a radial dynamic pressure is generated in a gap between the rotating shaft and the bearing member by a pumping effect of fluid on the dynamic-pressure generating grooves. As a result, for example when a radial force acts on the axis of rotation due to vibrations or other disturbance, the dynamic pressure acts as a restoring force, thus allowing a stable rotation accompanied by less swaying-rotations to be realized.

In another aspect, ball bearings have conventionally been used as a bearing for motors or the like that serve for rotationally driving the disk in polygon mirrors of laser printers, hard disk drives or the like. However, since a periodic sways would occur due to errors of sphericity of the ball or the like, it has recently been practiced to use dynamic-pressure bearings instead of the ball bearings.

In such a dynamic-pressure bearing, which is designed to generate a dynamic pressure to the fluid present in a gap of the bearing by a pumping effect, spiral dynamic-pressure generating grooves such as herringbone grooves are formed in either one of the bearing shaft or the bearing sleeve to generate the dynamic pressure.

FIG. 11 is a sectional view schematically showing a configuration in which a conventionally generally known pneumatic dynamic-pressure bearing 110 having a vacuum pump function is applied to a polygon-mirror dedicated scanner motor of a laser printer. In the polygon-mirror dedicated scanner motor shown here, a bearing shaft 114 of the dynamic-pressure bearing 110 is mounted on a base 113 so as to be installed in a fixed and closed state at a central position in a housing 112, a bearing sleeve 115 is fitted around the bearing shaft 114 with a very slight gap, and a rotating mirror 118 is attached to this bearing sleeve 115.

Further, a magnet 120 magnetized to N and S poles is provided on an outer circumferential surface of the bearing sleeve 115, and a driving coil 116 as a motor is provided on an inner wall surface of the housing 112 so as to be opposed to the magnet 120. In this arrangement, about a few $\mu$m deep V-shaped grooves 122, 122 . . . (herringbone grooves) are carved at regular intervals in the direction of rotation in the outer circumferential surface of the bearing shaft 114, where among these V-shaped grooves 122, 122 . . . , those carved in upper and lower portions of the bearing shaft 114 play a role of a vacuum pump and those carved at central portion of the bearing shaft 114 are purposed to support the bearing shaft 114 itself.

FIG. 12A shows an appearance view of the bearing shaft 114 of the dynamic-pressure bearing 110 shown in FIG. 11, and FIG. 12B shows a sectional view of the dynamic-pressure bearing 110 with the bearing sleeve included. As shown in FIGS. 12A and 12B, this bearing shaft 114 is internally formed into a hollow shape with one shaft end opened, gas inlet holes 124, 124 . . . for letting in gas (e.g. air) are provided at upper and lower portions of the bearing shaft 114, and gas inlet holes 125, 125 . . . for introducing gas (air in the atmosphere in this example) to around the bearing shaft 114 are provided between the base 113 of the bearing shaft 114 and the bearing sleeve 115.

In the dynamic-pressure bearing 110 constructed as shown above, when the rotating mirror 118 is rotated, air in the vessel is introduced through the gas inlet holes 125 into the bearing sleeve 115, then flowing on so as to be introduced into the hollow of the bearing shaft 114 via the gas inlet holes 124, 124 . . . of the bearing shaft 114 and discharged outside through the opening at one shaft end, as shown by arrows in the figure. Then, such a gas flow causes the internal pressure of the vessel to be reduced, enabling a smooth rotation without occurrence of a periodic sways or the like. When the rotating mirror 118 is stopped from rotating, the internal pressure of the vessel becomes equal to the external pressure.

Conventionally, groove machining by etching method has been used as a method for forming such dynamic-pressure generating grooves in the bearing shaft or the rotating mirror (bearing sleeve). This etching method includes masking in a specified configuration to form grooves at unmasked portions. Two types of methods are available to do this, one being wet etching which uses liquid phase—solid phase reaction with etchant and the other being dry etching which uses gas phase—solid phase reaction with reaction gas in plasma. Out of these two methods, the dry etching method is often used for groove formation by virtue of its relative superiority in machining precision. These etching methods are used for groove formation primarily in hard materials.

As another method for forming the grooves, rolling process has been used to form grooves of, for example, spiral or other shape. In this rolling process, material is sandwiched between dies or the like and, while being rotated by the dies or the like, plastically deformed, by which a specified configuration is formed. This rolling process is used for groove formation primarily in soft materials.

The formation of herringbone groove portions by the aforementioned etching method is largely affected in machining precision by the concentration of the etchant or the like. Also, the etchant erodes even inner circumferential surfaces of the herringbone groove portions, resulting in an unsatisfactory machining precision. Since configurational precision is required for herringbone groove portions to function as dynamic-pressure generating grooves, the etching method, which is low in machining precision, is unsuitable for the formation of herringbone groove portions. Furthermore, this etching method, which involves a totally large number of processes and moreover takes longer time for machining, is low in productivity and unsuitable for mass production, resulting in a poor practicability.

The rolling process, although suitable for machining of soft materials, is unsuitable for the formation of herringbone groove portions because dynamic-pressure bearings are made from hard material so as to withstand high-speed rotation. A hard material, if rolling processed, would tend to result in a considerable impairment of the shape of the dies or flaws of their surfaces. Deteriorations of the dies like this would cause the precision of the groove machining in a machining object to lower, and flaws of the surfaces of the dies would be transferred onto the surface of the machining object as they are, causing disadvantages that, for example, the surface of the machining object is unnecessarily cut out. This would result in an insufficient machining precision of dynamic-pressure generating grooves or the like in the process of machining the dynamic-pressure generating grooves in the bearing shaft or bearing sleeve of the dynamic-pressure bearing, so that a high-performance dynamic-pressure bearing could not be obtained.

On the other hand, in a mechanism using herringbone dynamic-pressure generating grooves, basically, enough radial dynamic pressure could not be generated unless the rotational speed is as high as 10–20 thousands of rotations in useless cases, thus making such problems as oil exhaustion due to the high-speed rotation more liable to occur. Also, in a low-rotation state upon a start-up or halt of the rotating mechanism, dynamic-pressure insufficiency that would inevitably be involved cause the bearing and the rotating shaft to come into contact with each other, making the members more liable to wear. Furthermore, although a dynamic-pressure bearing in which radial dynamic pressure is generated as a pneumatic pressure without using lubricating oil has also been proposed, yet use of pneumatic pressure would require further higher rotational speeds of 40–50 thousands of rotations to generate enough radial dynamic pressure according to discussions by the present inventors, in which case the aforementioned problems would matter to more extent. Therefore, besides improvement in the herringbone dynamic-pressure generating grooves, there is a desire for a mechanism capable of generating radial dynamic pressure with higher efficiency.

SUMMARY OF THE INVENTION

An object of the present invention is to provide a bearing mechanism which is capable of generating enough dynamic pressure even in lower-speed regions, and yet which can be easily surface-machined for the generation of radial dynamic pressure and manufactured with low cost, as well as a hard disk drive mechanism and a polygon mirror drive mechanism using the bearing mechanism. Another object of the invention is to provide a method for forming herringbone groove portions of a dynamic-pressure bearing which method is simple in manufacturing processes and low in manufacturing cost.

In order to solve the above objects, according to the present invention, there is provided a bearing mechanism comprising:
 a first member of a shaft shape; and
 a second member which has an insertion hole for the first member to be inserted through, and which forms, between an inner surface of the insertion hole and an outer circumferential surface of the first member, a bearing gap of a specified extent filled with a fluid while permitting the first member to rotate about an axis relative to the second member, wherein
 in at least either one of the outer circumferential surface of the first member or an inner circumferential surface of the second member opposed thereto, dot-like minute dips and bumps are formed dispersedly, whereby the surface is roughened so that a center-line mean roughness of the surface is controlled within a range of 0.1 $\mu$m–1.0 $\mu$m, and wherein the first member and the second member are rotated relative to each other so that a radial dynamic pressure is generated around the first member in the bearing gap. In addition, the term "center-line mean roughness" herein refers to a measurement obtained in compliance with a method defined JIS B0601.

Also according to the present invention, there is provided a hard disk drive mechanism comprising:
 the bearing mechanism as defined above;
 a driving section for, assuming that either one of the first member or the second member of the bearing mechanism is a fixed-side member and the other is a rotation-side member, driving the rotation-side member (hereinafter, referred to as rotating member) into rotation; and
 a hard disk for recording use which is fitted to the rotating member and which rotates integrally therewith.

Also, according to the present invention, there is provided a polygon mirror drive mechanism comprising:
 the bearing mechanism as defined above;
 a driving section for, assuming that either one of the first member or the second member of the bearing mechanism is a fixed-side member and the other as a rotation side member, driving the rotation-side member (hereinafter, referred to as rotating member) into rotation; and
 a polygon mirror which is integrated to the rotating member and which has a plurality of reflecting surfaces formed into a polyhedral shape so as to surround an axis of rotation of the rotating member.

Furthermore, according to the present invention, there is provided a method for forming herringbone groove portions of a dynamic-pressure bearing, comprising:
 for forming herringbone groove portions in an outer circumferential surface of a bearing shaft of the dynamic-pressure bearing and an inner circumferential surface of a bearing sleeve into which the bearing shaft is inserted, masking the outer circumferential surface of the bearing shaft of the dynamic-pressure bearing and/or the inner circumferential surface of the bearing sleeve with a masking sheet having penetration holes of a desired herringbone configuration; and projecting small-diameter particles onto the masked surface by precision shot peening.

In the bearing mechanism of the invention, in at least either one (hereinafter, referred to as roughened surface) of the outer circumferential surface of the first member or the inner circumferential surface of the second member opposed to each other with the bearing gap therebetween, dot-like minute dips and bumps are formed dispersedly, by which the surface is roughened so that its center-line mean roughness Ra is controlled within a range of 0.1 $\mu$m–1.0 $\mu$m, thus enabling the bearing mechanism to generate enough radial dynamic pressure even in lower-speed regions. Still, because enough dynamic pressure can be generated at lower rotational speeds as compared with conventional bearing mechanisms using conventional dynamic-pressure generating grooves, the time duration of a dynamic-pressure insufficiency upon a start-up or halt of the rotating mechanism is shortened so that members in the bearing part can be made less liable to wear.

Also, the fluid of a specified amount to be filled in the gap between the outer circumferential surface of the first member and the inner circumferential surface of the second member opposed thereto may be either a gas or a liquid, where when the fluid to be filled is a gas, the need for lubricating oil is eliminated. Then, because no lubricating oil is used, the bearing mechanism can be made maintenance-free at least for oil supply. Besides, because the need for considering sealing for oil leak prevention, the structure can be simplified.

On occasions, for example, when some imbalance is present in the rotating shaft inserted inside the cylindrical bearing body or when some disturbance such as external force or vibrations has occurred in the radial direction, the rotating shaft may yield periodic or a periodic swaying-rotations. Among all types of swaying-rotations, for a periodic swaying-rotation, the position to which the rotating shaft shifts due to the swaying-rotation can be grasped as a definite pattern, so that the correction of the rotating shaft is possible. However, for swaying-rotation that occurs a periodically, because of random time and position of the occurrence, correction is impossible. Nonetheless, for the bearing mechanism of the present invention as described above, the eccentricity ratio of a periodic sway of the first member about the axis of rotation in the insertion hole can be made to fall within a range of 20% and under. This and other effects can be obtained similarly whichever the fluid to be filled in the bearing gap is a gas or a liquid.

In order to generate a uniform radial dynamic pressure, it is desirable that dot-like minute dips and bumps are formed so as to be generally uniformly dispersed two-dimensionally on the roughened surface facing the bearing gap, for example, as conceptually shown in FIG. 2 (reference numeral 2a denotes the roughened surface in this case). More specifically, for example when the center-line mean roughness is measured in arbitrary directions, for example arbitrary two directions perpendicular to each other, on the roughened surface, given measured values Ra1 and Ra2, it is desirable that the ratio of the absolute value |Ra1−Ra2| of a difference between the two measured values, to the mean value (Ra1+Ra2)/2, that is, (2×|Ra1−Ra2|/(Ra1+Ra2)), be within 30%.

For the bearing mechanism of the present invention, the relative number of revolutions of the outer circumferential surface of the first member and the inner circumferential surface of the second member for enough radial dynamic pressure to be generated is desirably controlled to approximately 2000 rpm or more. Number of revolutions less than 2000 rpm would cause insufficient generation of dynamic pressure, making the members more liable to wear due to increase in contact friction. Also, the bearing mechanism of the present invention, as described before, has a characteristic that enough dynamic pressure can be generated even at low-speed rotation regions (e.g., in a region of about 2000–20000 rpm, or a further lower region of about 2000–15000 rpm), as compared with conventional bearing mechanisms. However, the present invention is not limited to these ranges of number of revolutions, but well applicable also to bearing parts which rotate at speeds higher than the above ones, capable of producing unique effects such as prolonged lives of the members attributable to the friction reduction effect of the dynamic pressure.

As to the reason that the bearing mechanism of the present invention is capable of generating dynamic pressure at lower speeds than in conventional bearing mechanism making use of dynamic-pressure generating grooves, one factor could be that if the fluid filled in the bearing gap is a gas, the gas present in the bearing gap is hard to leak out of the gap during the relative rotation of the members by virtue of the minute dips and bumps that are dispersedly formed in at least either one of the outer circumferential surface of the first member or the inner circumferential surface of the second member opposed thereto, or in other words that the sealability between the outer circumferential surface of the first member and the inner circumferential surface of the second member is improved. Such an effect of sealable improvement is more remarkable when the center-line mean roughness is controlled within a range of 0.15 $\mu$m–0.2 $\mu$m. As a result, for example, shortage of radial dynamic pressure less occurs even when further higher-speed rotation is required, so that smooth, less-swaying rotations can be realized.

If the fluid filled in the bearing gap is a liquid, one factor could be the contribution of a wedge film effect that develops when the liquid present in the bearing gap between the outer circumferential surface of the first member and the inner circumferential surface of the second member is let into the gap narrowed by the bumps, by virtue of the minute dips and bumps that are dispersedly formed in at least either one of the outer circumferential surface of the first member or the inner circumferential surface of the second member opposed thereto. Whereas the wedge film effect is also produced by a so-to-speak macroscopic factor that the gap is locally narrowed by a relative decentering of the first member and the second member, yet a microscopic wedge film effect by the dips-and-bumps formation, it can be considered, acts to produce a multiplier effect so that the dynamic-pressure generating effect is further enhanced. Besides, since these dips and bumps are formed in a finer dispersion, as compared with conventional dynamic-pressure generating grooves, a wedge film effect of even more uniform, higher level can be expected.

With regard to the sealability improvement, on the other hand, since minute dips and bumps are formed in the surface facing the bearing gap, a remarkable labyrinth effect is generated when the liquid passes through between the dips and bumps of the bearing gap, so that the sealability between the outer circumferential surface of the first member and the inner circumferential surface of the second member is improved. Then, the sealability improving effect like this becomes more remarkable when the center-line mean roughness Ra is controlled within the range of 0.15 $\mu$m–0.2 $\mu$m. As a result, for example, shortage of radial dynamic pressure less occurs even when further higher-speed rotation is required, so that smooth, less-swaying rotations can be realized.

In addition, the concrete constitution that allows the radial dynamic pressure to be utilized as a restoring force for the axis of rotation can be exemplified by an embodiment in which the first member has a rotation supporting portion which is formed so as to be in contact with a supported portion formed on the second member side, and which rotatably supports the second member while permitting the second member to move radially within a range of the bearing gap.

Next, the dot-like minute dips and bumps to be formed in the roughened surface can be formed by projecting impact particles having a mean particle size controlled within a range of 5–100 $\mu$m at a rate of 50 m/sec–300 m/sec onto the dips-and-bumps formation surface portion (a portion where the roughened-surface is formed). With this method, the surface roughening process for dispersedly forming the dot-like minute dips and bumps can be easily achieved, allowing a reduction in cost as compared with, for example, groove machining process by photo-etching or the like.

When particles harder than a material from which the dips-and-bumps formation surface portion is formed are used as the impact particles, the formation of the dips and bumps can be achieved efficiently. For example, when the material of the dips-and-bumps formation surface portion is an Fe-related material, the material of the hard particles may be ceramic particles such as silicon carbide, alumina, zirconia or silicon nitride, glass particles, or metal metallic particles such as high-speed tool steel or stainless steel (e.g., high-carbon stainless steel). In addition, there are some cases where the formation of dips and bumps is enabled even with use of impact particles that are not harder than the dips-and-bumps formation surface portion. For example, even with the use of impact particles that are not harder than the dips-and-bumps formation surface portion, if the impact particles have a 50% or more hardness of the surface portion, there are many cases where the formation of dips and bumps can be achieved.

As to the shape of the impact particles, it is particularly desirable to use spherical particles in order that minute dips and bumps are formed so as to be uniformly dispersed. In this case, use of spherical particles as uniform in size as possible is further advantageous in that the impact force can be uniformized. More specifically, given a mean particle size dm of the impact particles used and a standard deviation σd of a particle size d, it is preferable that the value of σd/dm is less than 0.05. In addition, whereas it is desirable to suppress variations in shape and dimensions of individual dips and bumps with a view to generating uniform radial dynamic pressure, it is effective to form the dips and bumps, for example, by iterating to a plurality of times the projection of the impact particles onto the dips-and-bumps formation surface portion.

Next, for the bearing mechanism of the present invention, from the viewpoint of sufficiently enhancing the radial-dynamic-pressure generating effect, given a radius r1 of the columnar-shaped outer circumferential surface of the first member and a radius r2 of the columnar-shaped inner circumferential surface of the second member, it is desirable that the value of r2−r1 is controlled within a range of 0.2–20 μm. The value of r2−r1 being, as it were, a parameter that reflects the size of the bearing gap, if the value is less than 0.2 μm, it becomes more likely that the outer circumferential surface of the first member and the inner circumferential surface of the second member come into contact with each other, making the members more prone to wear due to increase in friction in some cases. If the value of r2−r1 exceeds 20 μm, on the other hand, the sealability of the gap is impaired, making the generation of dynamic pressure insufficient in some cases. More desirably, the value of r2−r1 is within a range of 4 μm–10 μm. In addition, r1 and r2 herein refer to values that are calculated as D1max/2 and D2min/2, respectively, where when diameter D1 or D2 of the outer circumferential surface or the inner circumferential surface, respectively, is measured with the measuring position changed, a measured maximum value of D1 is assumed as D1max and a measured minimum value of D2 is assumed as D2min.

Next, given a radius r1 of the outer circumferential surface of the first member, a radius r2 of the inner circumferential surface of the second member and a cylindricity C of each surface, it is desirable that an expression that C≦(r2−r1)/2 is satisfied. If C is greater than (r2−r1)/2, then it becomes more likely that the outer circumferential surface of the first member and the inner circumferential surface of the second member come into contact with each other, making the members more prone to wear due to increase in friction in some cases. In addition, as the cylindricity herein referred to, a cylindricity defined in JIS (Japanese Industrial Standards) B0621, 5.4.

Next, the roughened surface having a center-line mean roughness unique to the present invention can be formed quite easily since the machining by the projection of hard particles as described above can be applied to, for example, the outer circumferential surface of the shaft-shaped first member. In this case, for the inner circumferential surface of the second member, at least the center-line mean roughness Ra is desirably controlled to 1.0 μm or less from the viewpoint of avoiding the wear of members due to friction increase. Then, in order to further enhance the swaying-rotation prevention effect with respect to the axis of rotation by virtue of the radial dynamic pressure generation, it is even more desirable that the inner circumferential surface of the second member also be made into a similar roughened surface.

It is also possible that groove portions that contribute to the radial dynamic pressure generation are formed together with the dot-like minute dips and bumps as described above in at least either one of the outer circumferential surface of the first member or the inner circumferential surface of the second member opposed thereto. By adding such groove portions, the swaying-rotation prevention effect by the radial dynamic pressure generation can be further enhanced.

Next, the method for forming herringbone groove portions of a dynamic-pressure bearing according to the present invention is a method in which injection (projection) machining such as shot peening and shot blasting, which has conventionally been used for relatively coarse machining processes such as deburring or surface satin processing, is applied to the formation of herringbone groove portions, where the machining precision, which has been an issue in etching or rolling process, is dramatically improved by controlling the material, particle size and projection pressure of the small-size particles, and yet simple fabrication is enabled.

As the "small-size particles" in this case, particles of alumina, silicon carbide, glass beads, plastics or the like are preferably used. The particle size of the "small-size particles" is preferably within a range of 5–100 μm, more specifically, 40–80 μm. If the particle size is smaller than 5 μm, it is difficult to form grooves having a expected depth. Also, if the particle size is larger than 100 μm, fine configuration cannot be formed with dimensional precision.

Further, the projection pressure for "precision shot peening" may be selected appropriately depending on the materials of the projecting member and the projected member or the like, but is preferably within a range of 1–10 kg/cm². If the projection pressure is smaller than 1 kg/cm², it takes too much time to form the grooves of an expected depth. Even if a pressure larger than 10 kg/cm² is applied, the depth of grooves that can be formed per unit area does not noticeably change, with the result that the load applied to the equipment is necessarily added.

Then, the equipment for "precision shot peening" is preferably one which is capable of projecting the "small-size particles" by controlling such conditions as projection pressure, projection amount per unit time, projection aperture of the nozzle, and the like, and also capable of quantitatively feeding the projection material (small-size particles).

Amount and time of projection per unit time may be selected as appropriate depending on the depth of formed groove portions. Further, projection aperture of the nozzle may be selected as appropriate depending on the particle size of the projection material and the configuration of the groove portions. "Masking" may be implemented by using metal resist, photoresist, printing resist or the like. As the metal resist, a stainless thin plate, nickel electrocast products or the like may appropriately be used. As the photoresist, those superior in resistance to shocks are preferable, and ultraviolet-curing type urethane resin or the like may appropriately be used. As the printing resist, screen printing may appropriately be used.

In method for forming herringbone groove portions of a dynamic-pressure bearing according to the present invention, after masking the outer circumferential surface of the bearing shaft or bearing sleeve of the dynamic-pressure bearing, small-size particles are projected onto the outer circumferential surface of the bearing shaft or the inner circumferential surface of the bearing sleeve by precision shot peening, by which herringbone groove portions are formed. Therefore, the method involves no such complex procedures as etching, and yet takes shorter time for the formation of thee herringbone groove portions, thus very high in productivity and capable of mass production.

Further, according to the present invention, because of small particle size of the projection material and the capability of projection in an extremely narrow range by changing the projection pressure and the projection nozzle aperture, there is no need of precision masking, and herringbone groove portions having fine configuration can simply be formed.

The method for forming herringbone groove portions of a dynamic-pressure bearing according to the present invention is a method which enables the formation of herringbone groove portions to be achieved in short time quite conveniently and which is enabled to greatly reduce the cost required for the formation, whereas conventional methods would take long time through several steps of processes to achieve the formation. That is, the method of the invention is not only capable of making herringbone groove portions of fine configuration conveniently and with precision, but also highly useful industrially by virtue of its suitability to mass production.

DETAILED DESCRIPTION OF THE PREFERRED EMBODIMENTS

Hereinbelow, embodiments of the present invention are described with reference to examples thereof illustrated in the accompanying drawings.

EXAMPLE 1

Figure 1:
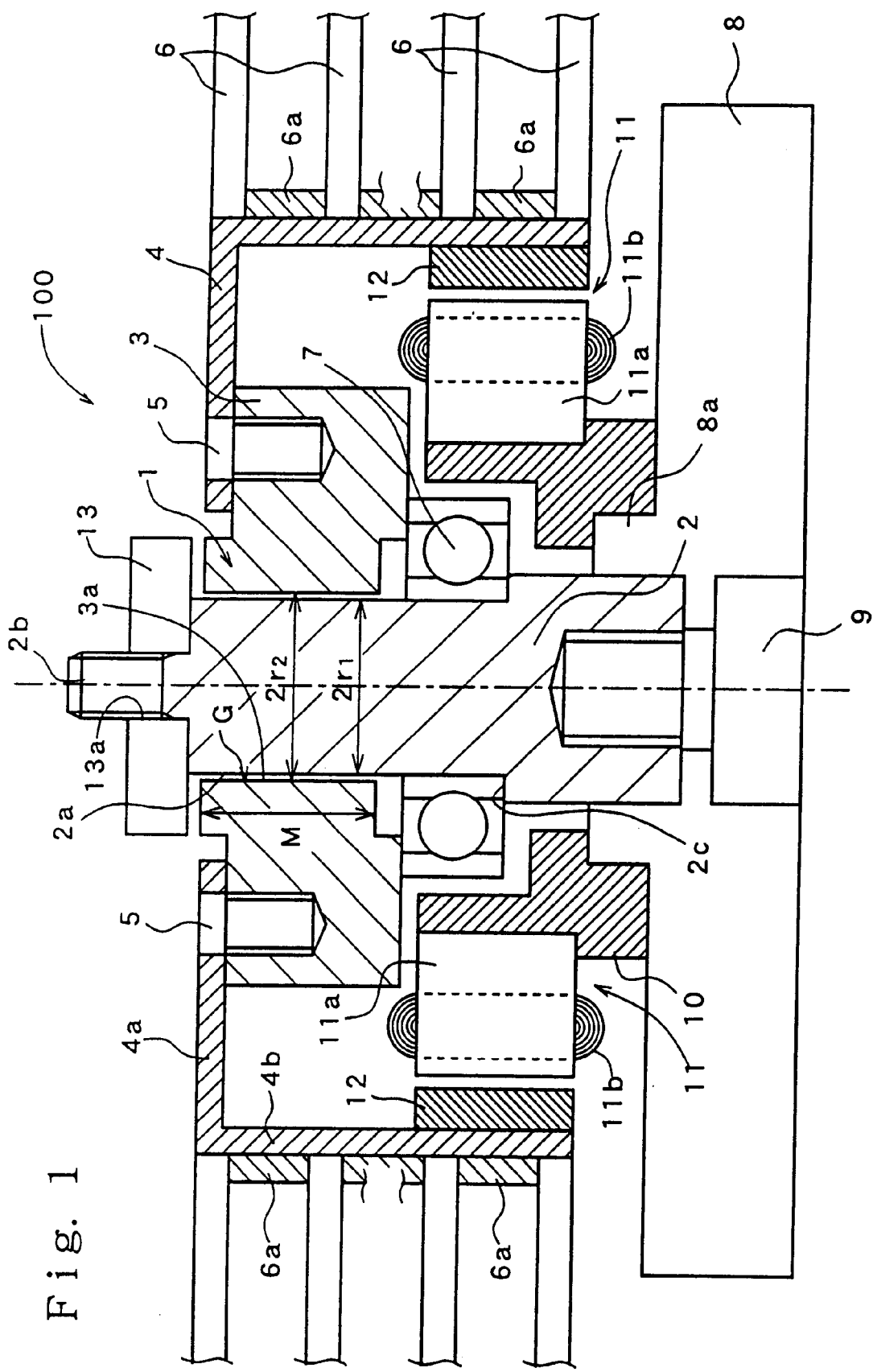
FIG. 1 is a longitudinal sectional view showing an example of a hard disk drive mechanism which adopts the bearing mechanism of the invention.

FIG. 1 shows an example of a hard disk drive mechanism which uses a bearing mechanism of the present invention. This hard disk drive mechanism 100 comprises a fixed shaft 2 as a first member secured to a base 8 with a bolt 9 in a state of standing up from one surface of the base 8, and a rotating member 3 as a second member rotatably disposed outside the fixed shaft 2, where the fixed shaft 2 and the rotating member 3 constitute main part of the bearing mechanism 1.

The fixed shaft 2 has an outer circumferential surface 2a formed into a cylindrical surface, and a base end portion made larger in diameter by a circumferential step surface 2c formed at an axially intermediate point. A bearing 7 is fitted outside the fixed shaft 2a and supported by the step surface 2c. Also, the rotating member 3 is formed into a cylindrical shape having an axially extending insertion hole 3a, and a top end side of the fixed shaft 2 is inserted into the insertion hole 3a, the other end face of the fixed shaft 2 being rotatably supported by the bearing 7. Then, a bearing gap G is formed between the inner circumferential surface of the insertion hole 3a and the outer circumferential surface 2a of the fixed shaft 2. This bearing gap G is filled with a fluid of either air (i.e. a gas), or lubricating oil or water (i.e. a liquid). In addition, a male screw portion 2b is formed so as to protrude from the top end surface of the fixed shaft, and a ring-shaped stopper 13 having a screw hole 13a is screwed to this male screw portion 2b, by which the rotating member 3 is secured from coming out.

The bearing 7 supported by the step surface 2c of the fixed shaft 2, or the first member, is in contact with an end face (supported portion) of the rotating member 3, or the second member, so that the bearing 7 functions as a rotation member which rotatably supports the rotating member 3 while permitting the rotating member 3 to move radially within a range of the bearing gap G.

Next, an annular fixed rib 8a is formed so as to protrude from a center of the plate surface of the base 8, where the base end portion of the fixed shaft 2 is fitted inside the fixed rib 8a while a cylindrical coil holder 10 is fitted outside the fixed rib 8a. Further outside the coil holder 10 is fixedly fitted a coil unit 11 which comprises a ring-shaped core 11a and a plurality of coils 11b wound around the core 11a at specified intervals in the circumferential direction.

On the other hand, a cup-shaped disk holder 4 is fitted to one end face of the rotating member 3 on one side opposite to the side on which the rotating member 3 faces the bearing 7. A top surface portion 4a of the disk holder 4 is formed flat, with the top end portion of the fixed shaft 2 protruding at a center of the top surface portion 4a, and the disk holder 4 is fixed at the top surface portion to the rotating member 3 with a bolt 5. Also, aside wall portion 4b of the disk holder 4 extends in a skirt-like state along the axis of the fixed shaft 2 up to such a position as to cover the coil unit 11, and a plurality of hard disks 6 for use of data recording are fitted to the outer circumferential surface of the disk holder 4 via spacers 6a. On the inner circumferential surface side of the disk holder 4, a plurality of permanent magnets 12 are fitted circumferentially at specified intervals at positions opposite to the coil unit 11. Then, these permanent magnets 12 make up a drive motor section (drive section) together with the coils 11b fitted to the coil unit 11, and play a role of driving the rotating member 3, as well as the disk holder 4 and the hard disks 6 fitted to the rotating member 3, to integrally rotate about the fixed shaft 2.

Figure 2A:
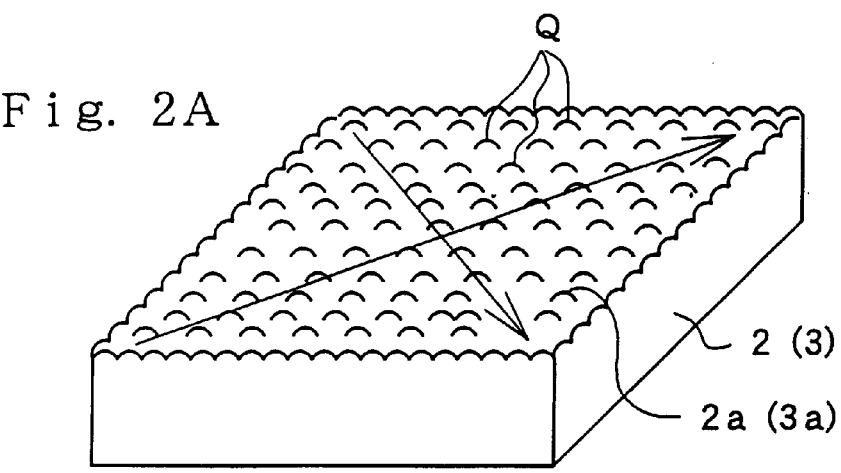
FIGS. 2A–2D are explanatory views schematically showing the state of roughened surfaces of the hard disk drive mechanism.

Next, in at least either one of the inner circumferential surface of the insertion hole 3a of the rotating member 3 or the outer circumferential surface 2a of the fixed shaft 2 (for example, a portion of the outer circumferential surface 2a opposite to the inner circumferential surface of the insertion hole 3a), dot-like minute dips and bumps Q are formed dispersedly as schematically shown in FIG. 2A, by which the surface is roughened so that its center-line mean roughness Ra is 0.1 $\mu$m–1.0 $\mu$m, desirably 0.15–0.2 $\mu$m.

Figure 5A:
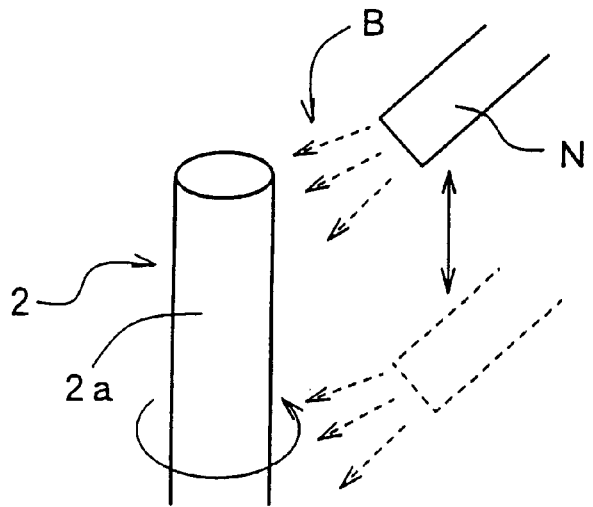
FIGS. 5A–5C are views schematically showing several examples of surface roughening process by projection of hard particles.

The method for roughening, for example, the outer circumferential surface 2a of the fixed shaft 2 as described above is exemplified by a method of projecting impact particles B from an injection nozzle N as shown in FIG. 5A. In this example, while the fixed shaft 2 is rotated about an axis, the injection nozzle N is moved back and forth along the axis, so that an impact is uniformly applied to the whole of the outer circumferential surface 2a.

Figure 5B:
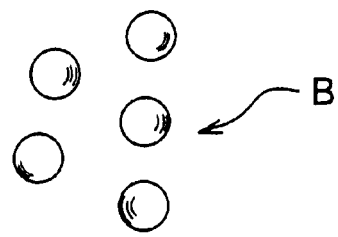
Figure 5B:
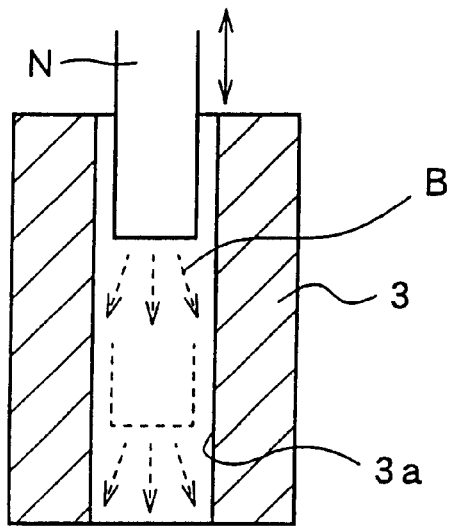
Figure 5C:
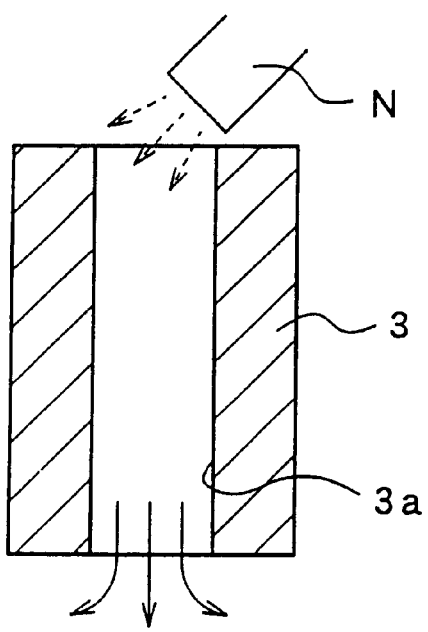

As to the inner circumferential surface of the insertion hole 3a, as shown in FIG. 5B, the method for surface roughening may be, by way of example, that the injection nozzle N is inserted into the insertion hole 3a and moved back and forth along the axis while injecting the impact particles B, thereby giving an impact. Alternatively, the method may be, as shown in FIG. 5C, that the injection nozzle N, with its injection hole positioned at one opening of the insertion hole 3a, is made to inject the impact particles B while exerting suction within the insertion hole 3a through the other opening.

For the impact particles B to be used, the mean particle size is controlled within a range of 5–100 $\mu$m, and the injection pressure from the nozzle N is controlled so that the rate of projection to the roughened surface (dips-and-bumps formation surface) becomes 50 m/sec–300 m/sec. The impact particles B are preferably spherical-shaped as described before, and desirably as uniform in diameter as possible. As for the material, for example when the fixed shaft 2 or the rotating member 3 is made of an alloy steel for mechanical structure (e.g., Cr—Mo steel such as SCM440), ceramic particles harder than the alloy steel, for example, silicon carbide particles may preferably be used as the impact particles B.

Figure 2B:
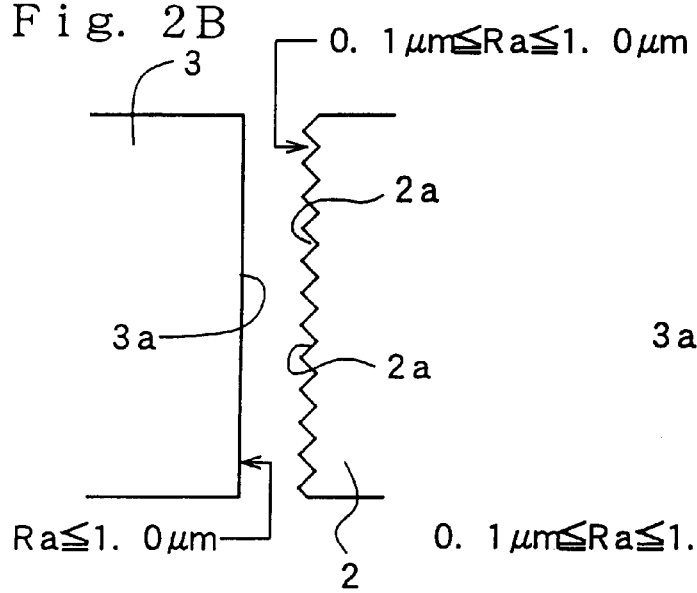
Figure 2C:
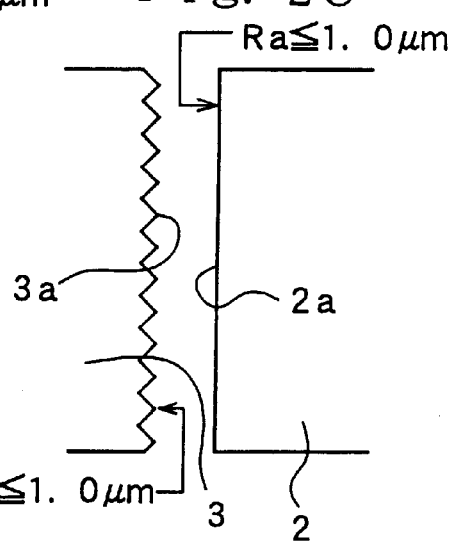
Figure 2D:
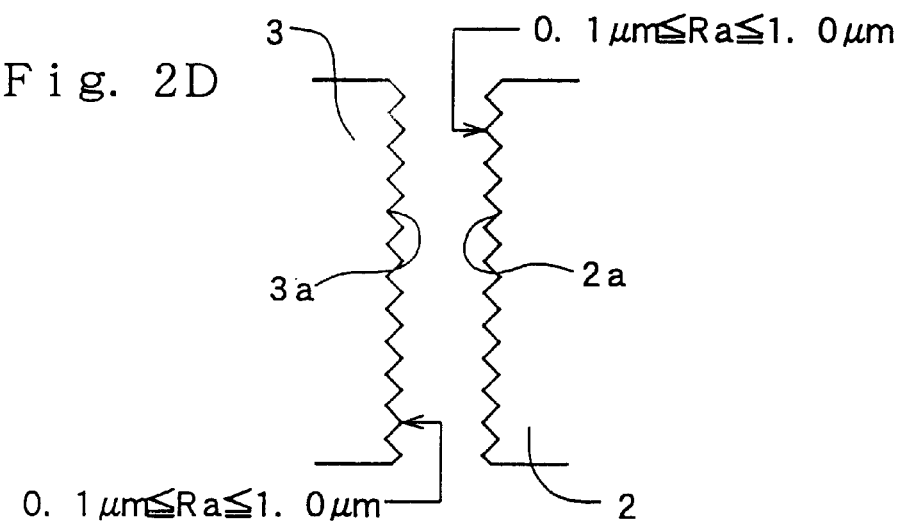

In this case, as shown in FIG. 2D, both the inner circumferential surface of the insertion hole 3a and the outer circumferential surface 2a of the fixed shaft 2 may be roughened so that $0.1\ \mu m \leq Ra \leq 1.0\ \mu m$, or only either one of the circumferential surfaces may be roughened as shown in FIG. 2B or 2C. However, the center-line mean roughness Ra of the other surface is desirably not more than 1.0 $\mu$m.

Next, given a radius r2 of the inner circumferential surface of the insertion hole 3a and a radius r1 of the outer circumferential surface of the fixed shaft 2 at a portion thereof inserted into the insertion hole 3a, their difference r2–r1 corresponding to the size of the bearing gap G is controlled to 0.2–20 $\mu$m (desirably, 4–10 $\mu$m). Also, each cylindricity C of the inner circumferential surface of the insertion hole 3a and the outer circumferential surface 2a of the fixed shaft 2 is controlled so that $C \leq (r2-r1)/2$. In this example, the concrete value of r2 and r1 is about 3 mm, and the value of r2–r1 is 8 $\mu$m. Also, the axial length M of the insertion hole 3a is about 20 mm. Then, the inner circumferential surface of the insertion hole 3a and the outer circumferential surface 2a of the fixed shaft 2 are controlled so that their center-line mean roughness Ra is about 0.19 $\mu$m.

In the hard disk drive mechanism 100 constructed as described above, by actuating the drive motor section, the rotating member 3 is rotated at a rotational speed of, for example, 4000–15000 rpm. Since the minute dips and bumps schematically shown in FIG. 2 are dispersedly formed in the surfaces 2a, 3a opposed to each other with the bearing gap G therebetween, where their center-line mean roughness has been controlled within the aforementioned range, a dynamic pressure radial of the fixed shaft 2 is generated in the bearing gap G. Then, even if a radial swaying force due to vibrations or the like acts upon the rotating member 3, the radial dynamic pressure serves as a restoring force, making swaying-rotations unlikely to occur.

With the constitution of the present invention, because only a relatively low rotational speed is required to generate enough radial dynamic pressure, the fixed shaft 2 and the rotating member 3 are less liable to wear. Also, when the fluid to be filled in the bearing gap G is air (i.e., a gas), no lubricating oil is used so that the bearing mechanism can be made maintenance-free at least for oil supply, and besides that the need for any sealing structure for oil leak prevention is also eliminated. Otherwise, in the case where the fluid to be filled in the bearing gap G is lubricating oil, water or the like (i.e., a liquid), it is considered that even upon action of the swaying force, when the liquid present in the bearing gap G is let into the clearances narrowed by the dispersedly formed bumps, a dynamic pressure is generated by a wedge film effect. It is also considered that when the liquid passes through between the dips and bumps of the bearing gap, there occurs a labyrinth effect, improving the sealability between the outer circumferential surface of the fixed shaft 2 and the inner circumferential surface of the rotating member 3.

Figure 3:
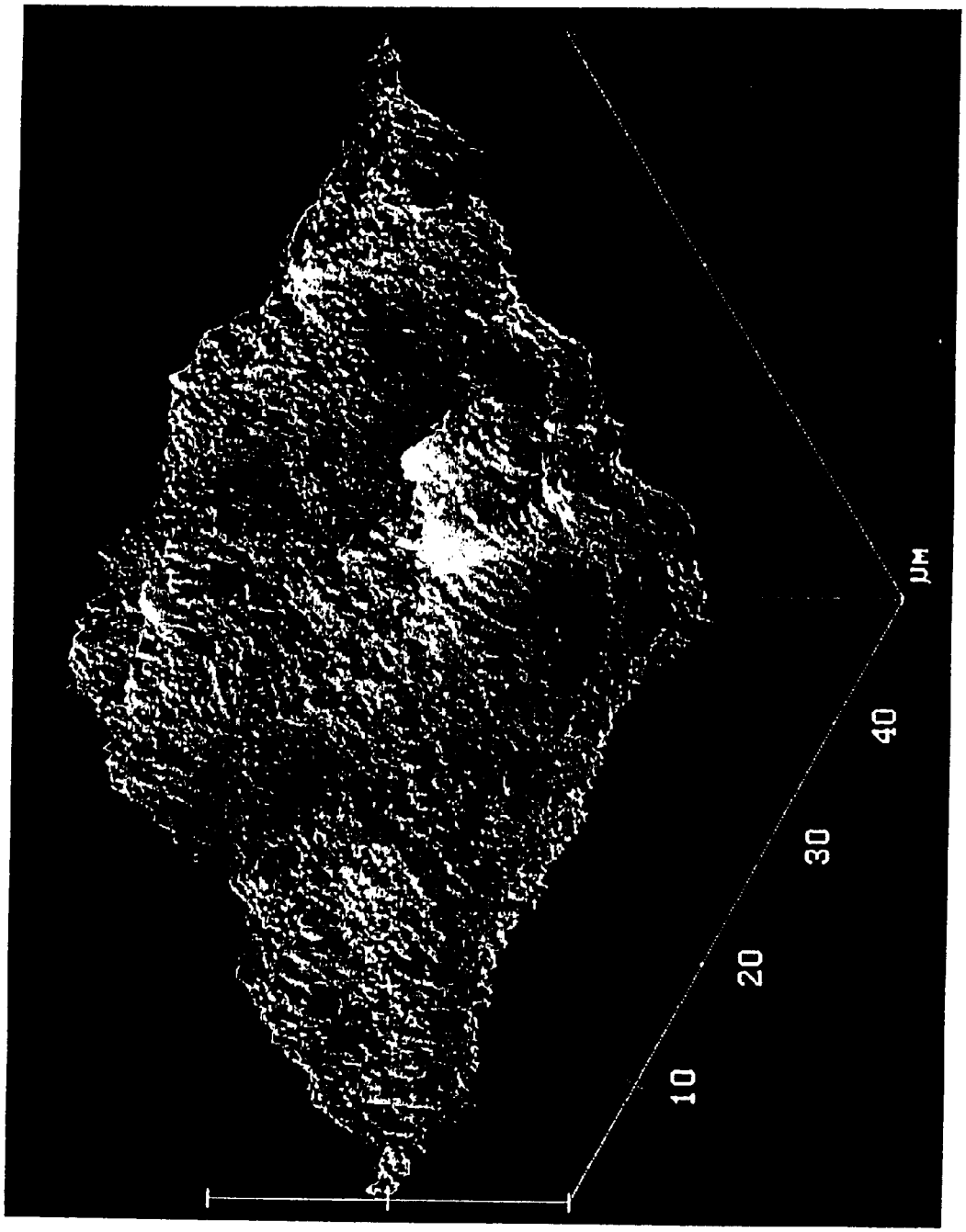
FIG. 3 is a view showing an example of three-dimensional mapping of a roughened surface formed by projection of hard particles.
Figure 4:
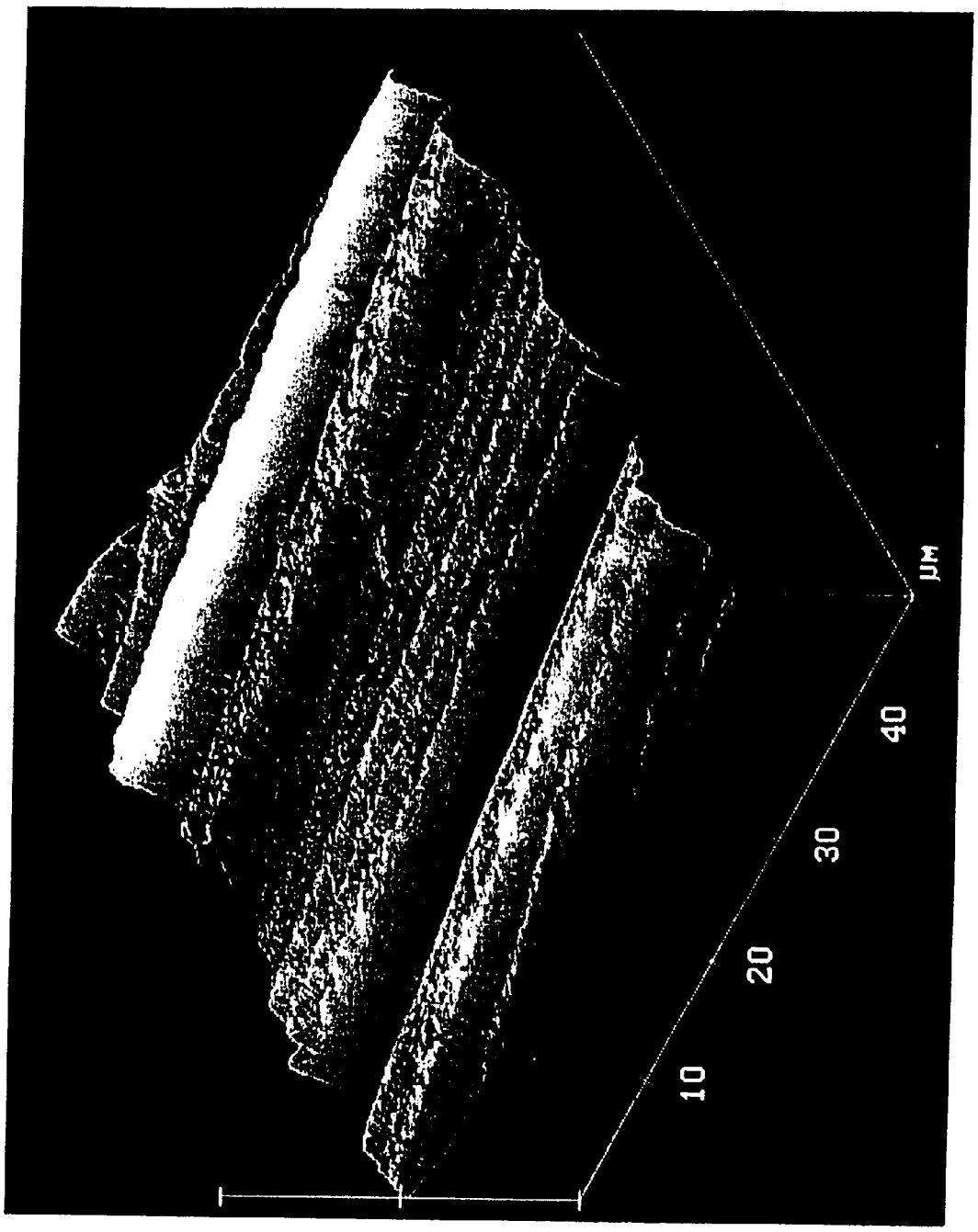
FIG. 4 is a view showing three-dimensional mapping of a roughened surface of a comparative example formed by grinding.

FIG. 4 shows an example of three-dimensional mapping of surface roughnesses of the outer circumferential surface of the fixed shaft 2 made of SCM440, where the surface roughnesses were obtainedby first cutting processing the surface with a 1a the and then grinding the surface circumferentially with a #1000 diamond grinding wheel, and by analyzing the resulting surface state with an interatomic force microscope. It can be seen that the surface, as a result of being ground with a strong rubbing by the grinder of one-way rotation, had highly directional, striped ups and downs formed thereon. Such a surface configuration would result in insufficient generation of dynamic pressure. FIG. 3, on the other hand, shows similar three-dimensional mapping showing a surface state which resulted after surface roughening process was carried out by projecting spherical silicon carbide particles having a mean particle size of 40 μm at a projection rate of 200 m/s. It can be seen that striped dips and bumps having a directionality disappeared and, instead, numerous dips and bumps were dispersedly formed with a two-dimensional uniform distribution. In addition, the center-line mean roughness of the surface after the processing is 0.19 μm.

EXAMPLE 2

Figure 6:
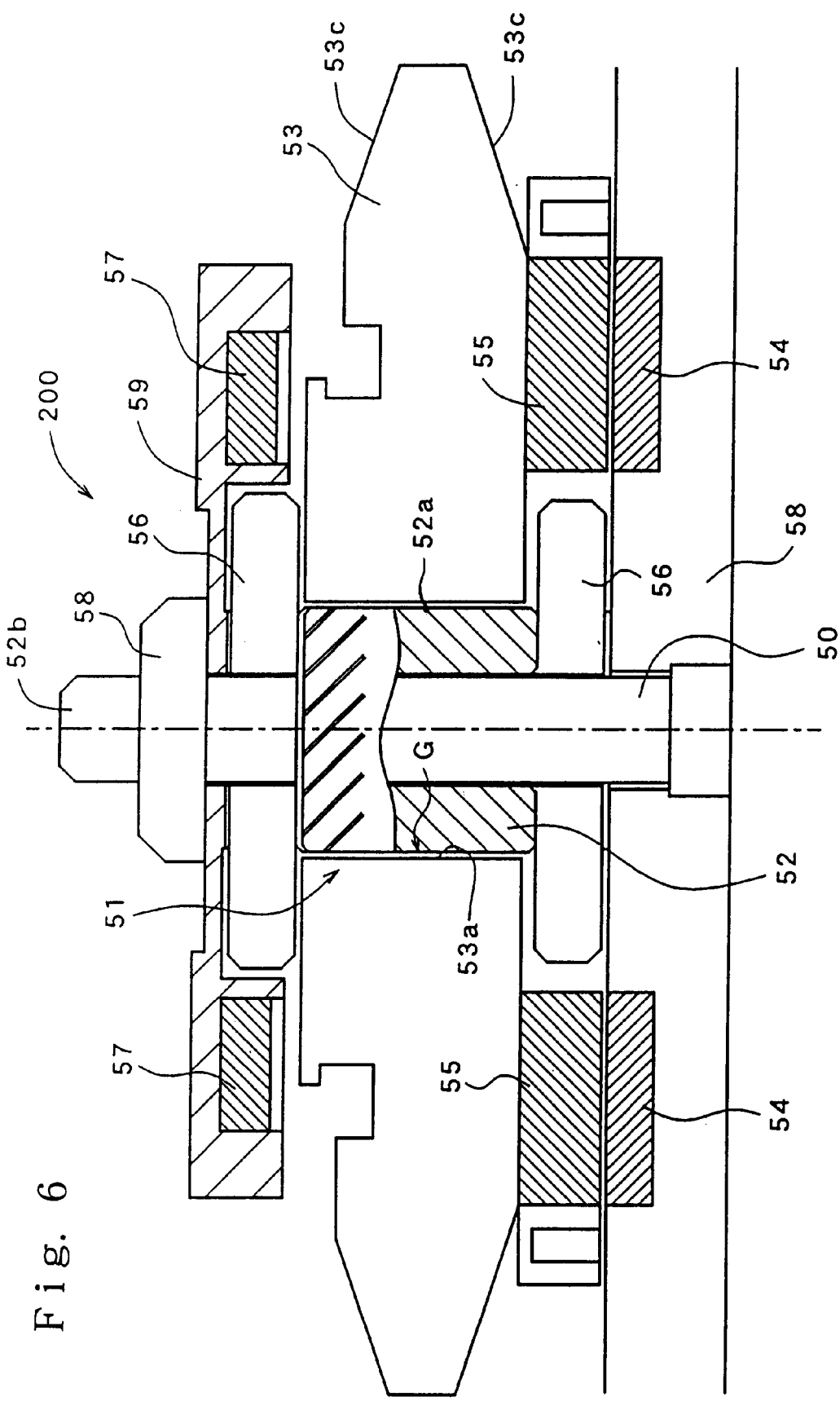
FIG. 6 is a longitudinal sectional view showing an example of a polygon mirror drive mechanism which adopts the bearing mechanism of the invention.

FIG. 6 shows an example of a polygon mirror drive mechanism using the bearing mechanism of the present invention. The polygon mirror drive mechanism 200 comprises a fixed shaft 50 having its base end side buried into a base 58 in a state of standing up from one surface of the base 58, a bearing member 52 unrotatably integrated outside the fixed shaft 50, and a polygon mirror 53 rotatably disposed further outside the bearing member 52a. The fixed shaft 50 and the bearing member 52 constitute a first member, and the polygon mirror 53 can be regarded as an integrally provided second member (rotating member). Then, those first member and second member constitute main part of a bearing mechanism 51.

An outer circumferential surface 52a of the fixed shaft 52 is formed into a cylindrical surface, and thrust bearings 56, 56 larger in diameter than the bearing member 52 are disposed on both sides of the bearing member 52 in its axial direction. The polygon mirror 53 has an axially extending insertion hole 53a, and a plurality of reflecting surfaces 53c are formed into a polyhedral shape so as to surround the axis of rotation O. The bearing member 52 and the fixed shaft 50 are inserted into the insertion hole 3a, while both-side end faces of the fixed shaft 50 are rotatably supported by the thrust bearings 56, 56. Then, a bearing gap G is formed between the inner circumferential surface of the insertion hole 53a and the outer circumferential surface 52a of the bearing member 52. This bearing gap G is filled with a fluid of either air (i.e. a gas), or lubricating oil or water (i.e. a liquid). In addition, the top end portion of the fixed shaft 50 protrudes so as to pass through a center portion of a disc-shaped magnet plate 59, and a male screw portion 52b is formed at the protruding portion, where a ring-shaped stopper 58 having a screw hole (not shown) is screwed at this male screw portion 52b. In addition, the thrust bearings 56, 56 serve as rotation supporting portions for the polygon mirror 53 as in Example 1.

Next, a plurality of coils 54 are buried in a plate surface of the base 58 so as to surround the fixed shaft 50, while a plurality of permanent magnets 55 are fitted to an end face of the polygon mirror 53 facing the coils 54. These permanent magnets 55 make up a drive motor section (drive section) together with the coils 54 on the base 58 side, and play a role of driving the polygon mirror 53 to rotate about the bearing member 52 (fixed shaft 50). Also, a plurality of permanent magnets 57 are fitted to a plate surface of the magnet plate 57 facing the opposite-side end face of the polygon mirror 53. The magnets 57 give the polygon mirror 53 buoyancy by their magnetic attraction, thus serving to prevent the thrust bearings 56, 56 from application of the whole dead weight of the polygon mirror 53.

In at least either one of the inner circumferential surface of the insertion hole 53a of the polygon mirror 53 or the outer circumferential surface 52a of the bearing member 52, dot-like minute dips and bumps Q are formed dispersedly as schematically shown in FIG. 2A, like Example 1, by which the surface is roughened so that its center-line mean roughness Ra is 0.1–1.0 μm, desirably 0.15–0.2 μm. The method for formation of this surface-roughened portions is utterly the same as in Example 1 and so omitted in detailed description.

In the polygon mirror drive mechanism 200 constructed as described above, by actuating the drive motor section, the polygon mirror 53 is rotated at a rotational speed of, for example, 10000–40000 rpm. Since the minute dips and bumps schematically shown in FIG. 2 are dispersedly formed in the surfaces 52a, 53a opposed to each other with the bearing gap G therebetween, where the center-line mean roughness of the minute dips and bumps has been controlled within the aforementioned range, a dynamic pressure radial of the fixed shaft 50 is generated in the bearing gap G. This radial dynamic pressure contributes to the prevention of swaying-rotations of the polygon mirror 53.

EXAMPLE 3

Figure 7A:
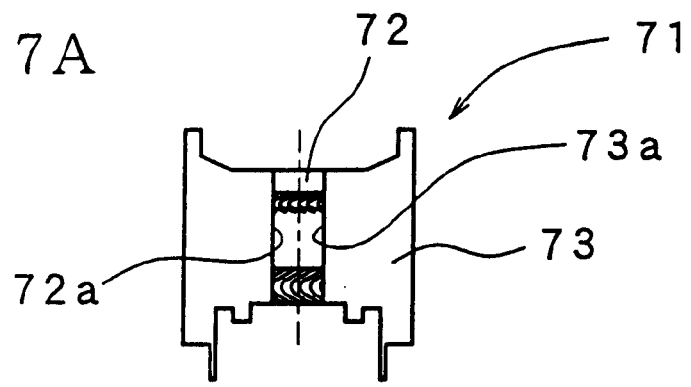
FIGS. 7A and 7B are explanatory views showing an example of the formation of groove portions with minute dips and bumps on the roughened surface.
Figure 7B:
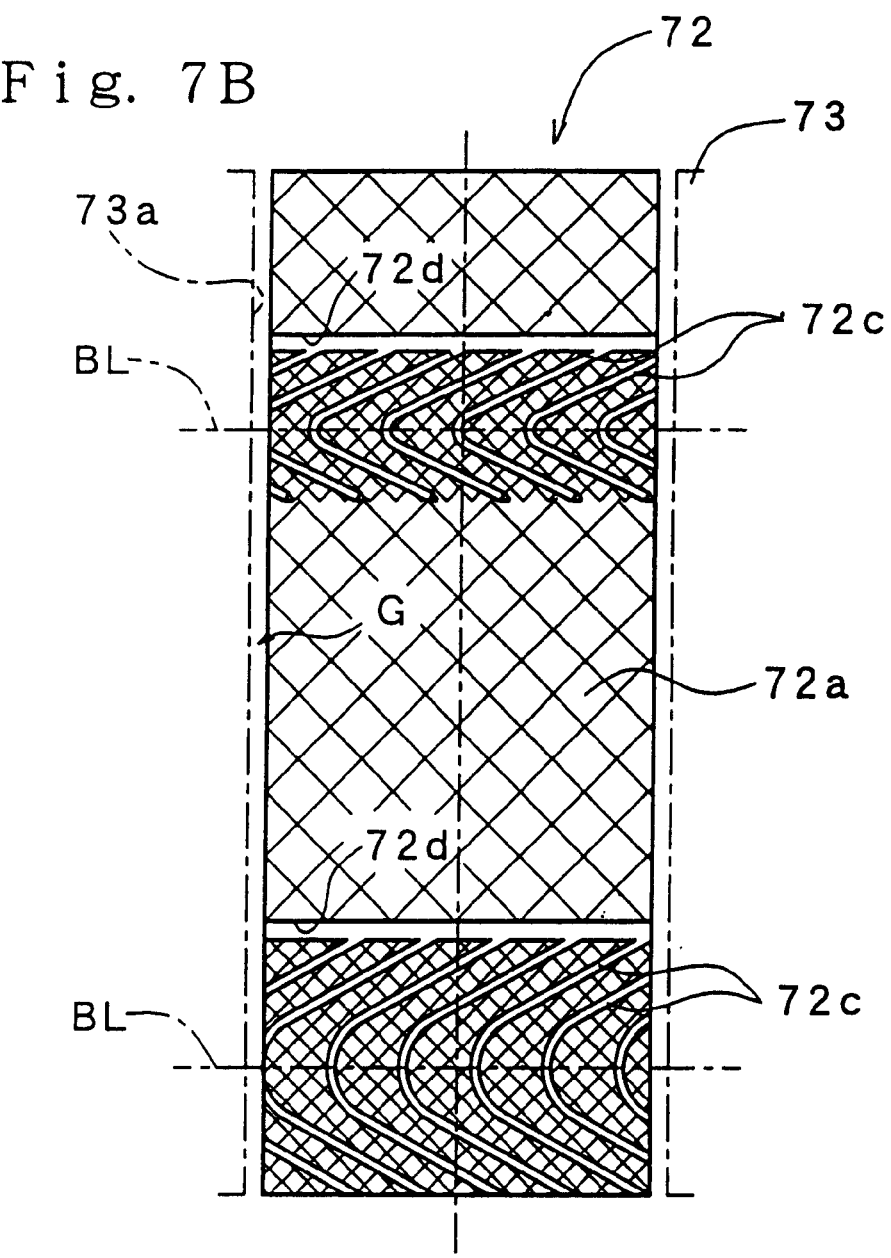

In the bearing mechanism of the present invention, in at least either one of the outer circumferential surface of the first member or the inner circumferential surface of the second member opposed thereto, groove portions that contribute to the generation of a radial dynamic pressure can be formed together with the dot-like minute dips and bumps. An example of this is shown in FIG. 7. In this bearing mechanism 71, a bearing gap G is formed between an outer circumferential surface 72a of a fixed shaft 72 and an inner circumferential surface of an insertion hole 73a of a rotating member 73 which is disposed outside the outer circumferential surface 7a. In the outer circumferential surface of the fixed shaft 72, rows of groove portions 72c for dynamic pressure generation are formed at a plurality (two in this example) of places in the axial direction. In each row of the groove portions, groove portions are formed at specified intervals over the entire circumference so that the tip of a chevron (or boomerang) pattern of each groove portion 72c is positioned on a base line BL extending circumferentially of the fixed shaft 72 (in the so-called herringbone state). Also, for each of the rows, circumferentially extending auxiliary groove portions 72d are formed so as to connect one-side end portions of the groove portions 72c.

On the entire outer circumferential surface 72a excluding those groove portions 72c, 72d and including groove-to-groove portions, the surface roughening process has been executed by dispersedly forming minute dips and bumps as in Example 1 or Example 2. In addition, the method for forming the groove portions 72c, 72c can be exemplified by masking the outer circumferential surface 72a with groove-pattern forming portions exposed and, in this state, performing etching process to carve a groove pattern, and then removing the masking. Otherwise, groove portions may be formed by providing wear-resistant masking, and performing shot blast grinding on exposed portions to thereby carve a groove pattern. In either case, the surface roughening process for the formation of dips and bumps on the surface except the grooves is desirably executed prior to the groove pattern formation so that the formed groove pattern is not worn out.

In order to verify the effects of the present invention, the following experiments of various types were conducted.

EXAMPLE 4

Figure 8:
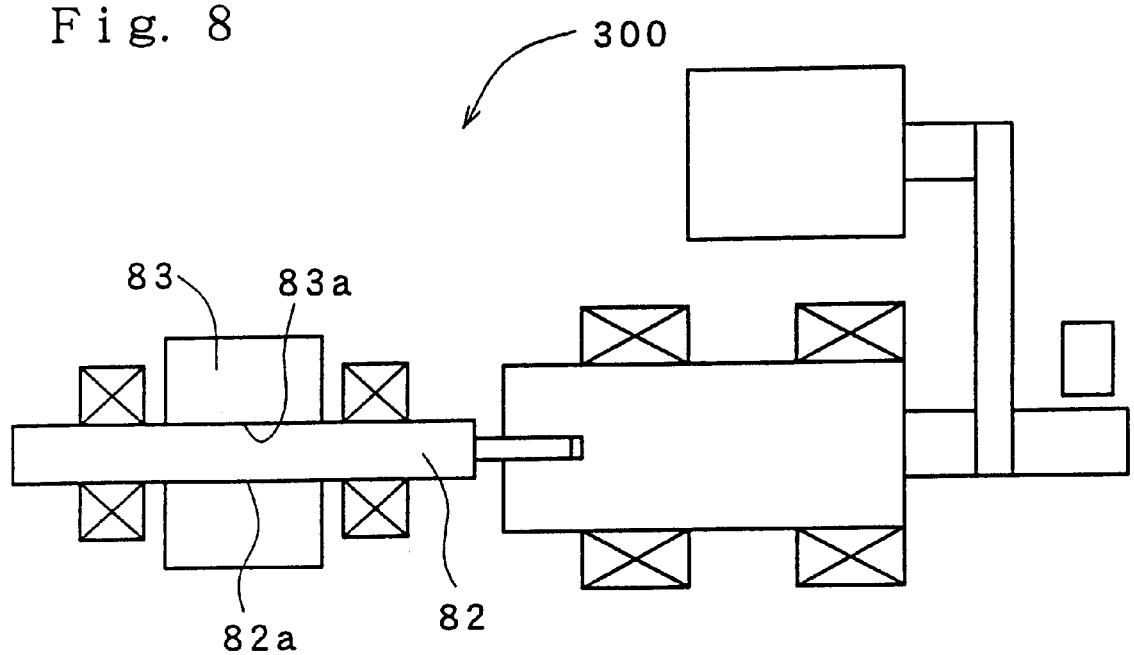
FIG. 8 is a schematic view of equipment for evaluating frictional force of the bearing gap used in Examples 4 and 5.
Figure 8:
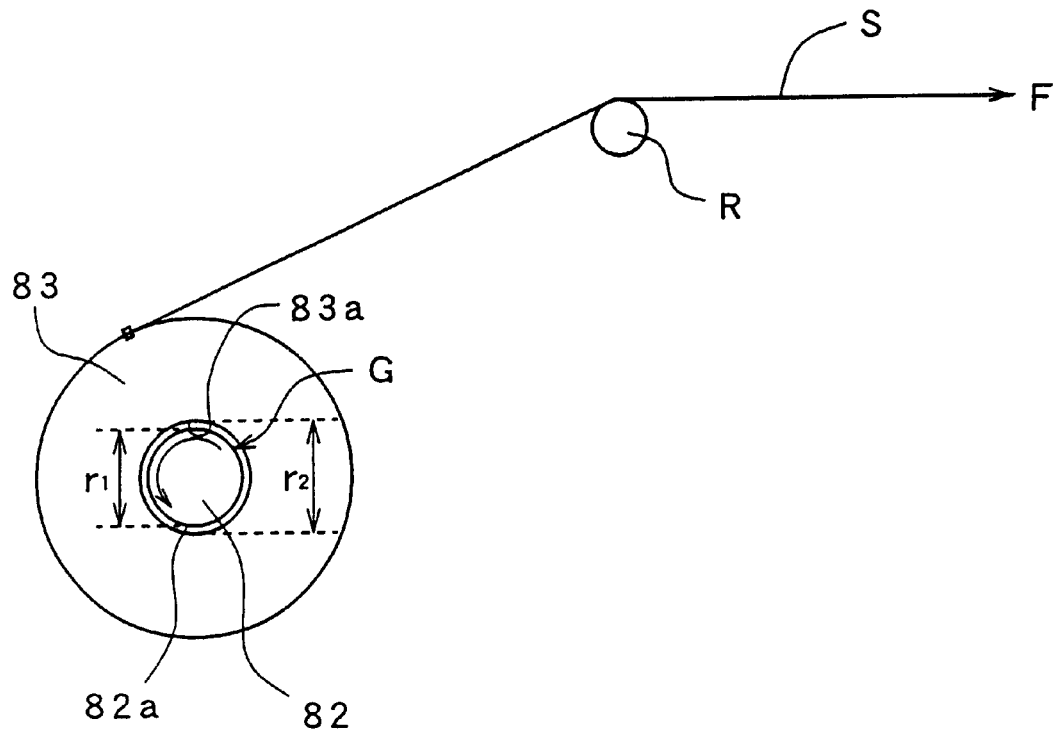

With equipment shown in FIG. 8, the relationship between surface roughness of both surfaces sandwiching the bearing gap and bearing performance was examined under various conditions. First, the equipment 300 of FIG. 8 was so constructed that a shaft 82 (first member) that had been subjected to various types of surface roughening processes on its outer circumferential surface was integrally rotatably fitted to an end face of a columnar-shaped shaft holder rotatably supported by a bearing, and that a cylindrical-shaped rotated member 83 having an insertion hole 83a that had also been subjected to various types of surface roughening processes was fitted to outside of the shaft 82. It is noted that the shaft 82 was supported by the bearing on both sides of the rotated member 83.

The rotated member 83 was formed from SCM440 into a cylindrical shape having an outer diameter of 30 mm, an insertion-hole radius r2 of 6 mm (in the case where the fluid to be filled into the bearing gap G was a gas) or an insertion-hole radius r2 of 3 mm (in the case where the fluid to be filled into the bearing gap G was a liquid), and an axial length of 20 mm. Also, as to the shaft 82, its outer-circumferential-surface radius r1 was controlled by cutting so that r2−r1 (size of the bearing gap G) would be various values of 0.19–21.0 $\mu$m. In addition, surface roughnesses of the cut surface were Ra=0.09 $\mu$m, Rmax=1.2 $\mu$m, and Rz=0.9 $\mu$m. Then, the inner circumferential surface of the insertion hole 83a and the outer circumferential surface 82a of the shaft 82 were roughened by projecting spherical silicon carbide particles having a mean particle size of 40–50 $\mu$m as impact particles at a rate of 180 m/sec–200 m/sec so that their center-line mean roughnesses would be various values of 0.07–1.5 $\mu$m. In addition, as a comparative example, another unit in which the outer circumferential surface 82a of the shaft 82 was processed by circumferential grinding (diamond grinding wheel, #1000), and in which the inner circumferential surface of the insertion hole 83a was processed by drill cutting was prepared as well.

With these units set in the equipment 300 of FIG. 8, the shaft holder and the shaft 82 were driven into rotation at various values of 4000 rpm and 8000 rpm by a servo motor via a belt, and an accompanying-rotation force that was developed to the rotated member 83 by the rotation of the shaft 82 was measured. The accompanying-rotation force decreases as the bearing friction decreases with a successful dynamic pressure generated, whereas the accompanying-rotation force increases with increasing friction. In addition, the measurement of the accompanying-rotation force was conducted by fixing one end of silk gut S to the outer circumferential surface of the rotated member 83, extending the silk gut S toward one side opposite to the direction of the accompanying-rotation, and then measuring a tensile force that developed to the silk gut S by an unshown load indicator mounted on the other end side of the silk gut S.

Figure 9:
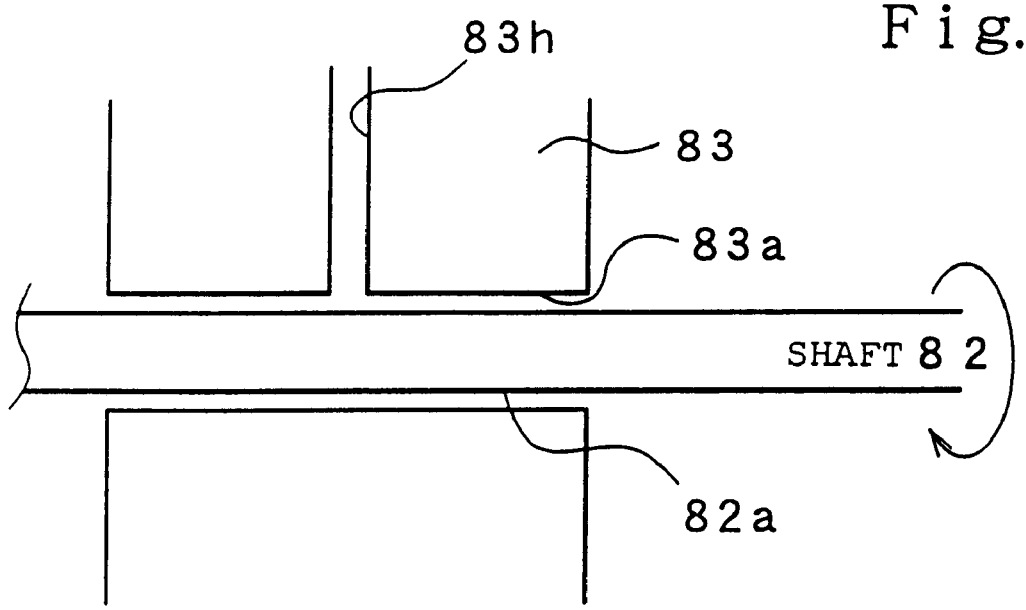
FIG. 9 is a view for explaining the principle of evaluation of sealability of the bearing gap also used in Examples 4 and 5.
Figure 9:
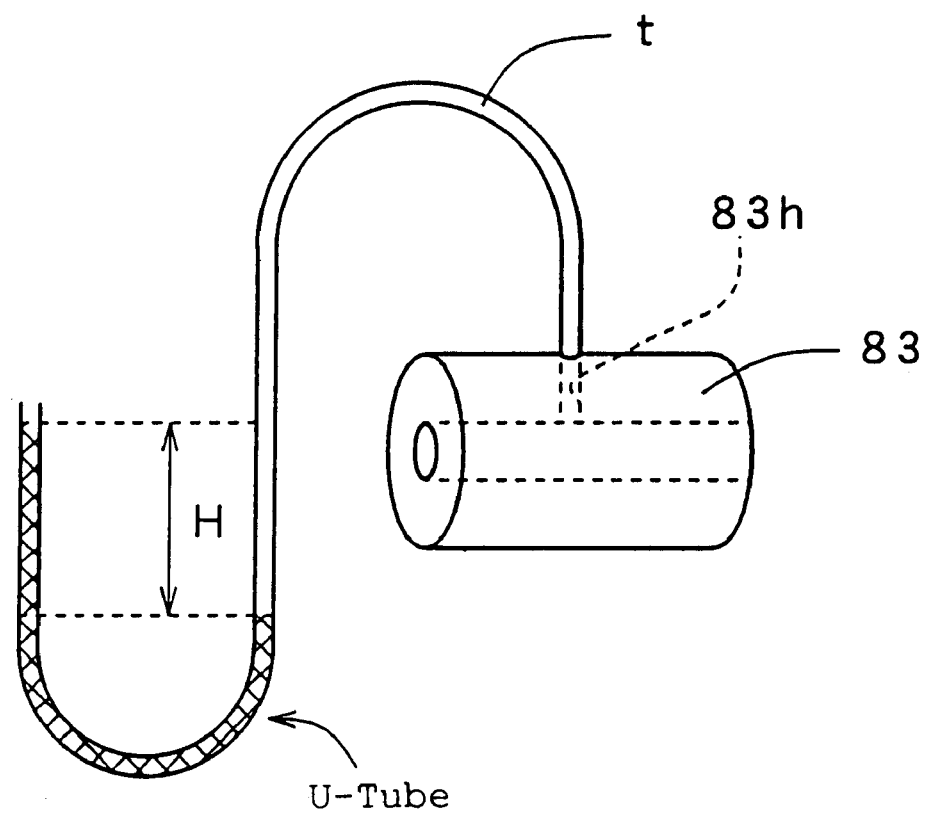

Also, sealing state of the bearing gap G was evaluated as follows. As shown in FIG. 9, a measuring hole 83h (with inner diameter about 1.9 mm) communicating with the insertion hole 83a was formed in a wall portion of the rotated member 83, and with a U-tube fitted to the measuring hole 83h via a tube t, a pressure difference H between the pressure of the bearing gap G and the external pressure increasing with the dynamic pressure generation was read. If the sealing state of the bearing gap G is faulty, the generated dynamic pressure leaks out of the gap so that the pressure decreases, so that the pressure difference H decreases.

Thus, as to the state of friction development in the case where the fluid to be filled in the bearing gap G was a gas, assuming that the accompanying-rotation force was F, evaluation was made by ranking test articles of F<5 g as "⊚", 5 g≦F<10 g as "o", 10 g≦F<15 g as "Δ", and F≧15 g as "x", while as to the sealability, assuming that the pressure difference was H, evaluation was made by ranking test articles of H≧100 Pa as "⊚", 50 Pa≦H<100 Pa as "o", 10 Pa≦H<50 Pa as "Δ", and H<10 Pa as "x". Results are shown in Table 1 and Table 2.

Also, as to the state of friction development in the case where the fluid to be filled in the bearing gap G was a liquid, assuming that the accompanying-rotation force was F, evaluation was made by ranking test articles of F<50 g as "⊚", 50 g≦F<100 g as "o", 100 g≦F<150 g as "Δ", and F≧150 g as "x", while as to the sealability, assuming that the pressure difference was H, evaluation was made by ranking test articles of H≧100 KPa as "⊚", 50 KPa≦H<100 KPa as "o", 10 KPa≦H<50 KPa as "Δ", and H<10 KPa as "x". Results of these evaluations are the same as in the evaluations of friction development state in the case where the fluid to be filled in the bearing gap G was a gas, and Table 1 and Table 2 are taken as an aid.

TABLE 1

| | Roughness of shaft outer surface (Ra: $\mu$m) | Roughness of insertion hole inner surface (Ra: $\mu$m) | $r_2 - r_1$ ($\mu$m) | 4000 rpm Friction development | 4000 rpm Sealability | 8000 rpm Friction development | 8000 rpm Sealability |
|---|---|---|---|---|---|---|---|
| 1* | 0.07 | 0.07 | 15 | X | Δ | X | ○ |
| 2 | 0.1 | 0.1 | 15 | ○ | ○ | ⊚ | ⊚ |
| 3 | 0.15 | 0.15 | 15 | ⊚ | ⊚ | ⊚ | ⊚ |
| 4 | 0.17 | 0.17 | 15 | ⊚ | ⊚ | ⊚ | ⊚ |
| 5 | 0.2 | 0.2 | 15 | ⊚ | ⊚ | ⊚ | ⊚ |

TABLE 1-continued

| | Roughness of shaft outer surface (Ra: μm) | Roughness of insertion hole inner surface (Ra: μm) | $r_2 - r_1$ (μm) | 4000 rpm Friction development | Sealability | 8000 rpm Friction development | Sealability |
|---|---|---|---|---|---|---|---|
| 6 | 0.5 | 0.5 | 15 | ○ | ○ | ⊙ | ⊙ |
| 7 | 0.7 | 0.7 | 15 | ○ | ○ | ○ | ○ |
| 8 | 1.0 | 1.0 | 15 | ○ | ○ | ○ | ○ |
| 9* | 1.5 | 1.5 | 15 | Δ | X | X | X |
| 10 | 0.07 | 0.17 | 15 | Δ | ○ | Δ | ○ |
| 11 | 1.5 | 0.17 | 15 | Δ | Δ | Δ | ○ |

Rows indicated by symbol * are out of invention scope.

TABLE 2

| | Roughness of shaft outer surface (Ra: μm) | Roughness of insertion hole inner surface (Ra: μm) | $r_2 - r_1$ (μm) | 4000 rpm Friction development | Sealability | 8000 rpm Friction development | Sealability |
|---|---|---|---|---|---|---|---|
| 21 | 0.17 | 0.17 | 0.19 | Δ | ⊙ | X | ⊙ |
| 22 | 0.17 | 0.17 | 0.25 | ○ | ⊙ | Δ | ⊙ |
| 23 | 0.17 | 0.17 | 0.5 | ○ | ⊙ | ○ | ⊙ |
| 24 | 0.17 | 0.17 | 1.0 | ⊙ | ⊙ | ○ | ⊙ |
| 25 | 0.17 | 0.17 | 5.0 | ⊙ | ⊙ | ⊙ | ⊙ |
| 26 | 0.17 | 0.17 | 10.0 | ⊙ | ⊙ | ⊙ | ⊙ |
| 27 | 0.17 | 0.17 | 15.0 | ⊙ | ○ | ⊙ | ⊙ |
| 28 | 0.17 | 0.17 | 21.0 | ○ | Δ | ○ | ○ |
| 29* | 0.17 (Peripheral grinding) | 0.17 (Drill Cutting plane) | 10.0 | X | X | X | Δ |

Symbol * denotes Comparative Example.

Consequently, it can be understood from the results of Table 1 that, by controlling the center-line mean roughness Ra of the inner circumferential surface of the insertion hole 83a and the outer circumferential surface 82a of the shaft 82 within the range of 0.1 μm–1.0 μm, rotational friction is reduced and moreover sealability is successful. Among others, with Ra falling within a range of 0.15–0.2 μm, remarkably successful sealabilities were achieved even at low-speed rotation (4000 rpm). In addition, relatively successful results are obtained even when either one of the inner circumferential surface of the insertion hole 83a or the outer circumferential surface 82a of the shaft 82 satisfies the aforementioned roughness condition according to the results of No. 10 and No. 11, whereas it is apparent according to a comparison with the results of Nos. 2–8 that more excellent results are obtained when both satisfy the condition. On the other hand, in the cases of No. 29 of Table 2, which resulted in a surface state that minute dips and bumps were not formed dispersedly, the result turned out absolutely unsuccessful although the roughness range satisfies the above condition.

On the other hand, according to the results of Table 2, it can be understood that the developed friction particularly at high-speed rotation (8000 rpm) is made low level by controlling the value of r2−r1 within 0.2–20 μm, and that a more successful dynamic-pressure generation state is obtained.

Further, in Table 3 are shown measurement results of center-line mean roughness Ra, maximum height Rmax, and ten-point mean roughness Rz of a roughened surface obtained by projecting silicon carbide particles having various mean particle sizes at various rates for a period of 0.2 minute per process with respect to the shaft 82.

TABLE 3

| | Mean particle size (μm) | Projection rate (m/sec) | Number of iterations of projection | Ra (μm) | Rmax (μm) | Rz (μm) |
|---|---|---|---|---|---|---|
| 51 | 1 | 200 | 1 | 0.09 | 1.2 | 0.9 |
| 52 | 5 | 200 | 1 | 0.11 | 1.3 | 1.0 |
| 53 | 10 | 200 | 1 | 0.16 | 1.5 | 1.0 |
| 54 | 30 | 200 | 1 | 0.18 | 2.0 | 1.2 |
| 55 | 40 | 200 | 1 | 0.19 | 2.3 | 1.2 |
| 56 | 60 | 200 | 1 | 0.20 | 2.5 | 1.3 |
| 57 | 80 | 200 | 1 | 0.24 | 3.2 | 1.5 |
| 58 | 100 | 200 | 1 | 0.30 | 5.3 | 2.2 |
| 59 | 150 | 200 | 1 | 0.45 | 6.2 | 4.3 |
| 60 | 40 | 30 | 1 | 0.15 | 1.2 | 0.9 |
| 61 | 40 | 50 | 1 | 0.15 | 1.2 | 0.9 |
| 62 | 40 | 100 | 1 | 0.16 | 1.6 | 1.0 |
| 63 | 40 | 150 | 1 | 0.18 | 2.0 | 1.0 |
| 64 | 40 | 200 | 1 | 0.19 | 2.3 | 1.2 |
| 65 | 40 | 250 | 1 | 0.20 | 2.4 | 1.3 |
| 66 | 40 | 300 | 1 | 0.21 | 2.6 | 1.5 |
| 67 | 40 | 350 | 1 | 0.21 | 2.9 | 1.5 |
| 68 | 40 | 20 | 5 | 0.15 | 2.3 | 1.0 |

It can be understood that roughnesses suitable for the present invention were obtained when impact particles controlled within a range of 5–100 μm mean particle size were projected at a rate of 50 m/sec–300 m/sec.

EXAMPLE 5

Figure 10:
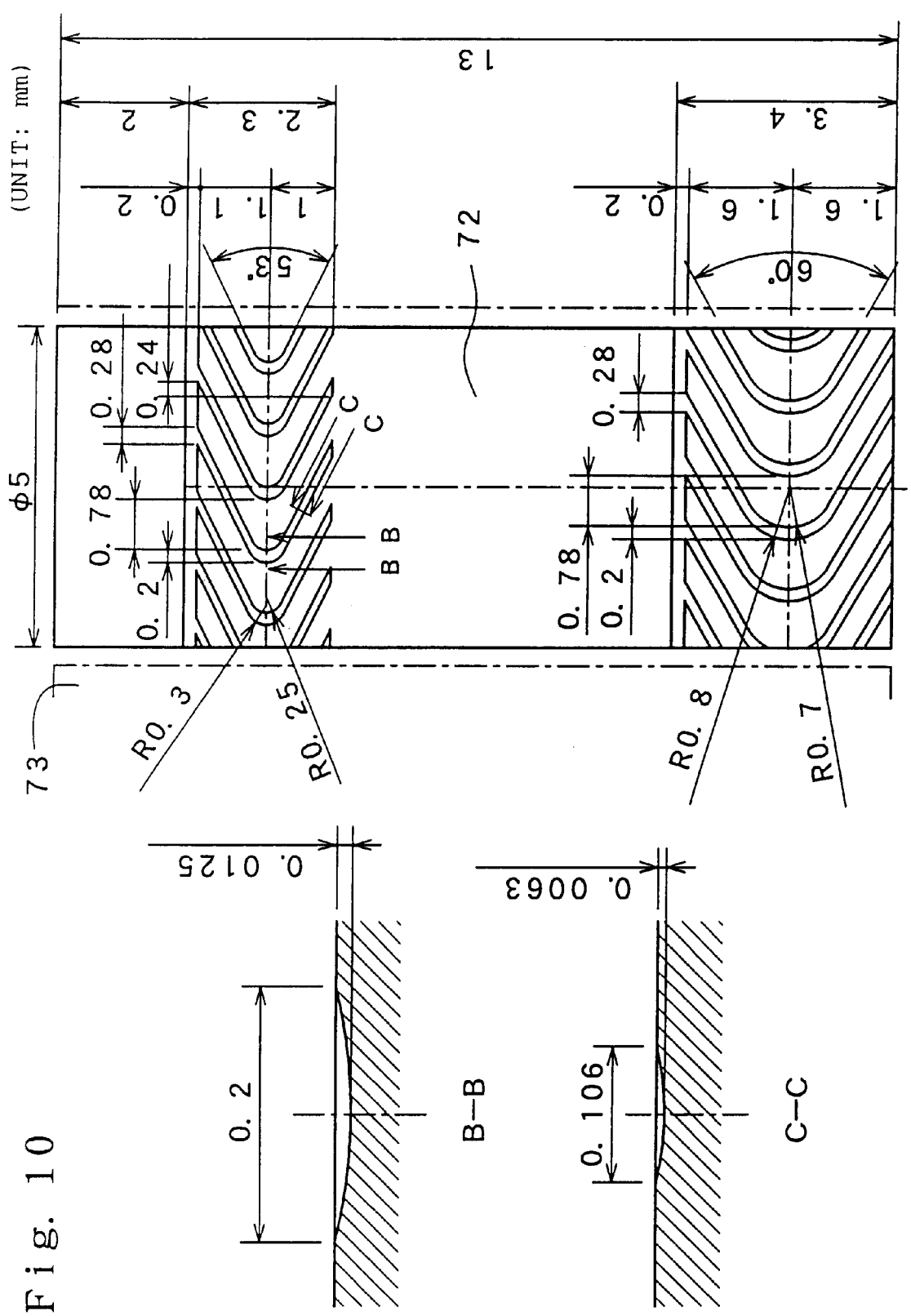
FIG. 10 is a view showing the dimensions of groove portions formed on the shaft side in Example 5.
Figure 11:
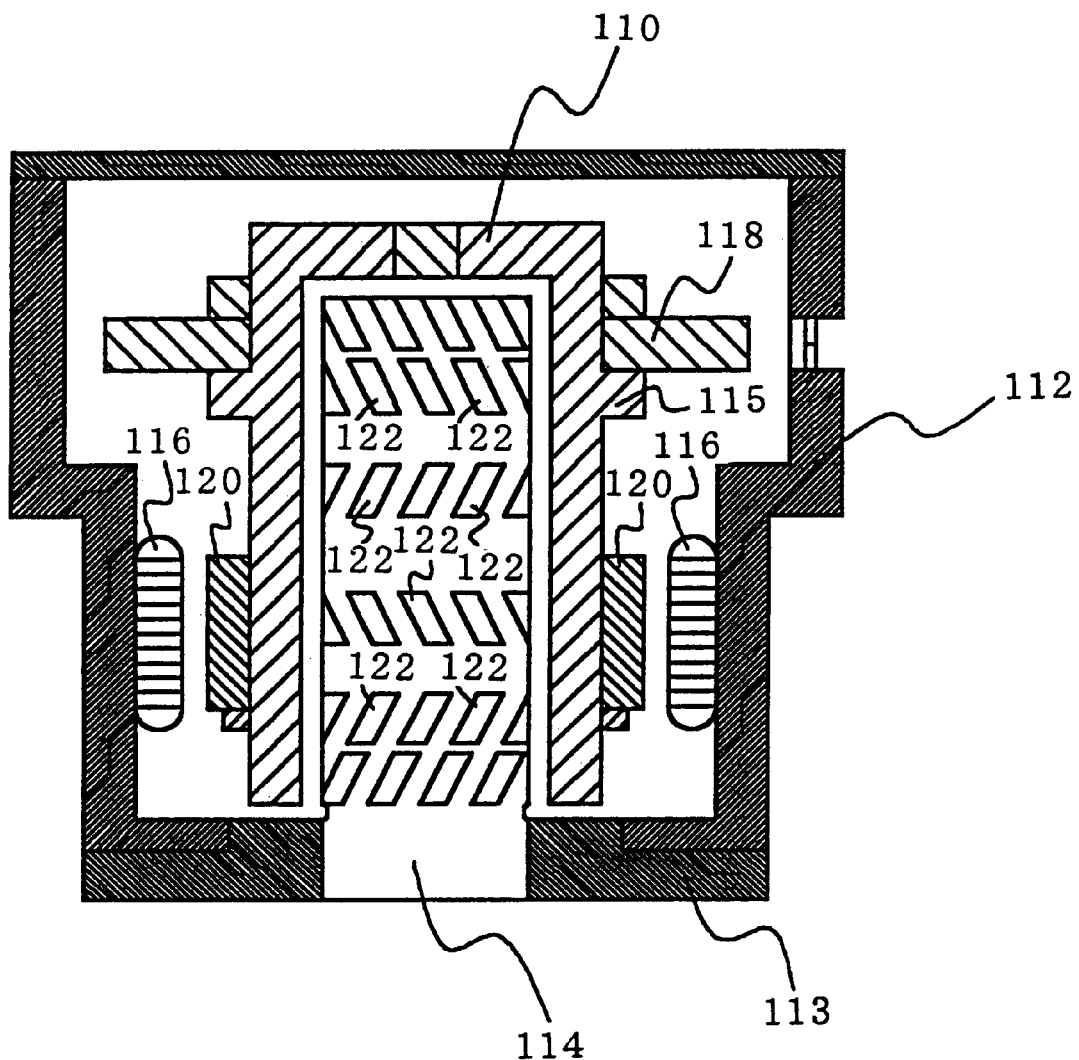
FIG. 11 is a view schematically showing the construction of a polygon-mirror dedicated scanner motor of a laser printer using a generally known dynamic-pressure bearing of the prior art.
Figure 12A:
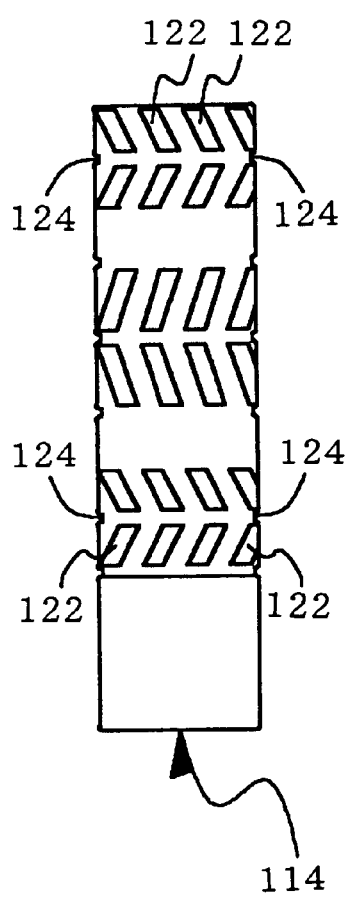
FIGS. 12A and 12B are a view schematically showing the appearance of the dynamic-pressure bearing shown in FIG. 1, and a sectional view thereof, respectively.
Figure 12B:
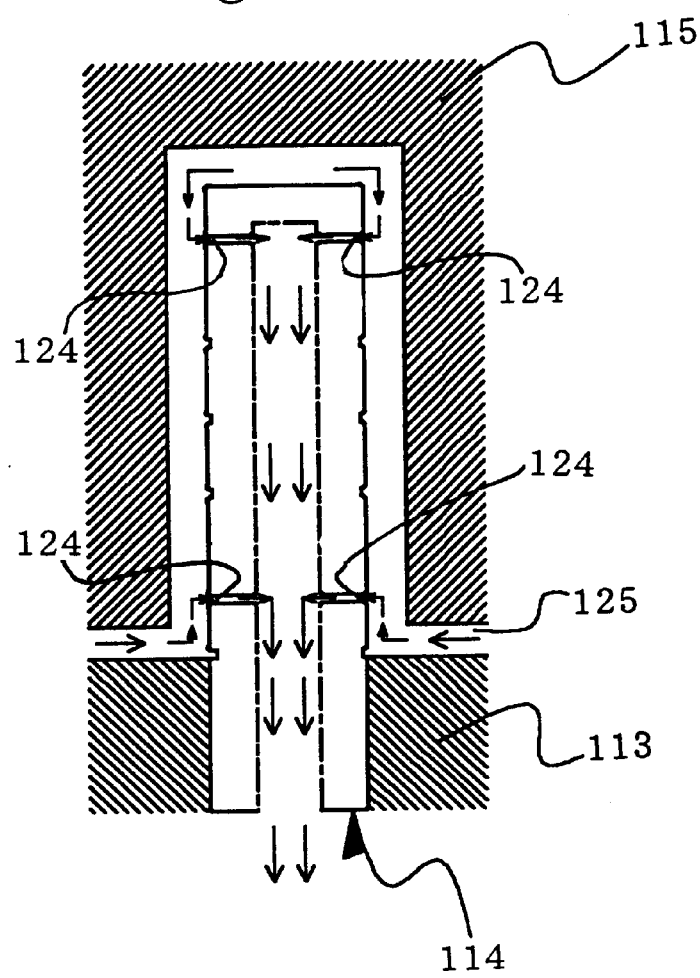

With the same material as in Example 1, a rotated member 83 was formed into a cylindrical shape having an outer diameter of 20 mm, an insertion-hole radius r2 of 3 mm, and an axial length of 20 mm. Also, as to the shaft 82, its outer-circumferential-surface radius r1 was controlled so that r2−r1 (size of the bearing gap G) would be 8 μm. Then, the inner circumferential surface of the insertion hole 83a and the outer circumferential surface 82a of the shaft 82 were roughened by projecting spherical silicon carbide particles having a mean particle size of 40–50 μm as impact particles at a rate of 180 m/sec–220 m/sec so that their center-line mean roughnesses would be various values of 0.01–1.3 μm. Two shafts 82 whose surfaces were roughened in this way were prepared for each condition, and in one of the two shafts 82, groove portions similar to those shown in FIG. 7 were formed at dimensions shown in FIG. 10. With these test articles incorporated into the equipment 300 of FIG. 8, evaluations of friction development state and sealability were made, and results are shown in Table 4:

TABLE 4

| Ra (μm) | Grooves | Sealability | | Friction development |
|---|---|---|---|---|
| 0.01* | Provided | Δ | 0 | × |
| | Not provided | × | 0 | × |
| 0.1 | Provided | ⊚ | 1000 pa | ⊚ |
| | Not provided | ○ | 200 pa | ○ |
| 0.2 | Provided | ⊚ | 1000 pa | ⊚ |
| | Not provided | ○ | 200 pa | ○ |
| 0.3 | Provided | ⊚ | 900 pa | ⊚ |
| | Not provided | ○ | 170 pa | ○ |

The row indicated by symbol * is out of invention scope.

Consequently, it can be understood that the shaft 82 in which groove portions were formed was successful in both sealability and friction development state.

EXAMPLE 6

Next, an embodiment of the method for forming herringbone groove portions of the dynamic-pressure bearing according to the present invention is described in detail.

First, Test Articles 1–8 are those formed in which groove portions were formed while the projection material, the particle size of projection material and the projection pressure were varied, by a herringbone groove portion forming method using precision shot peening according to the present invention.

Figure 13:
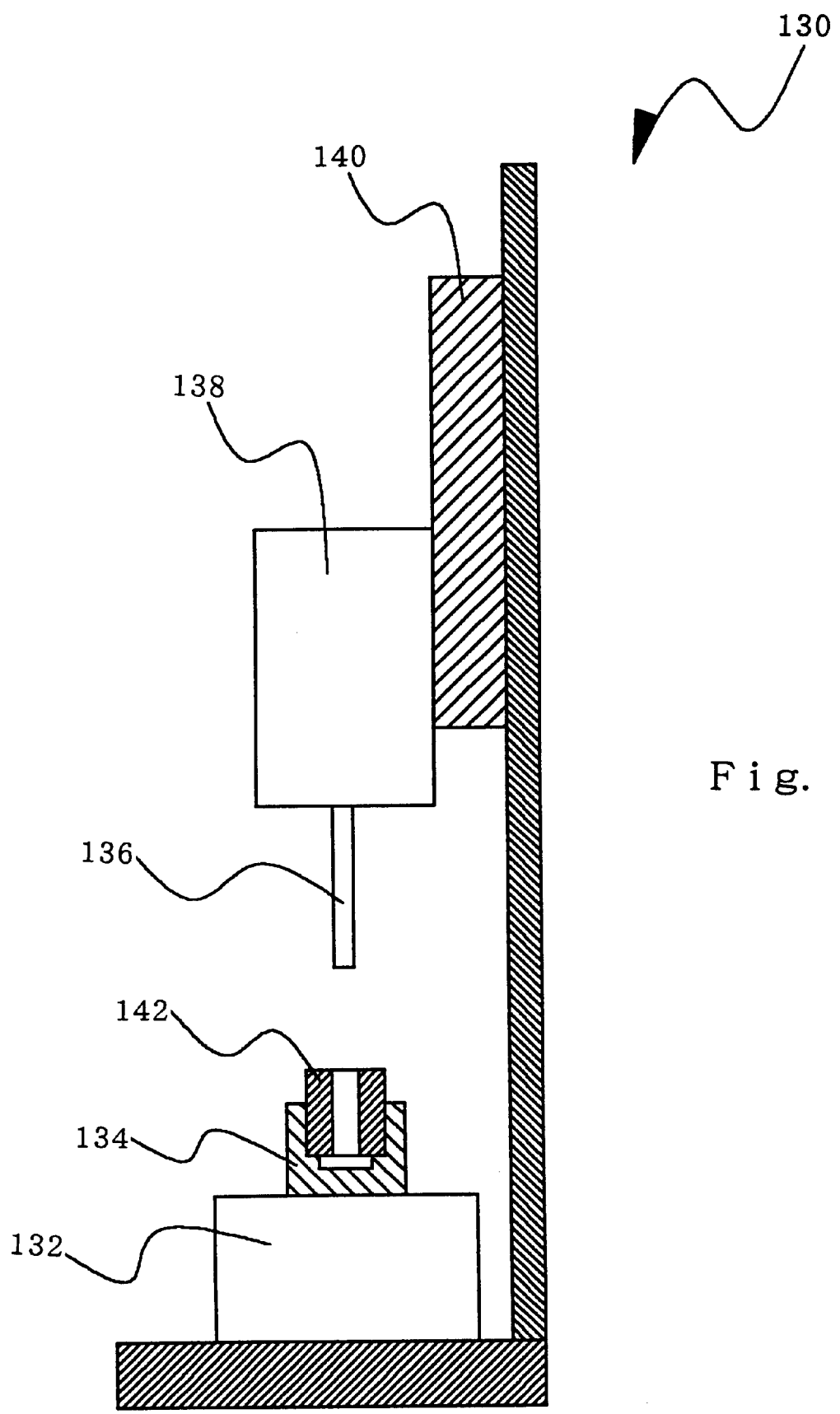
FIG. 13 is a view schematically showing the construction of fine powder injection equipment used in the examples of the invention.

The precision shot peening of Test Articles 1–8 was performed by fine powder injection equipment, Pneuma Blaster (made by Fuji Seisakusho), on bearing sleeves each of which was made from SCM440 (HT material) as projected material. FIG. 13 schematically shows this fine powder injection equipment.

In the fine powder injection equipment 130 shown in FIG. 13, a holder 134 for holding a workpiece 142 (a bearing sleeve in this example) is provided in a machining table 132, a chamber 138 for accommodating therein hard beads, a projection material, is provided in a slide 140 which is provided so as to be vertically movable, and a hard-bead injection nozzle 136 is rotatably supported by the chamber 138 so as to be positioned on the workpiece 142 held by the holder 134. Then, for the formation of herringbone grooves on the workpiece 142 with this equipment, a herringbone-groove forming surface of the workpiece 142 is previously masked by a masking sheet having penetration holes of the groove shape corresponding to the herringbone grooves, then the slide 140 is driven so that the chamber 138 is lowered, by which the nozzle 136 is lowered vertically while being rotated, the projection material is injected at a position where the hard-bead injection nozzle 136 has come to face the workpiece 142, by which herringbone groove portions of specified shape are formed.

Test Articles 1–4 were those which were processed by precision shot peening with hard beads used as the projection material. Fabrication conditions for the individual test conditions are shown in Table 5. Hard beads having a particle size of 40 μm for Test Articles 1 and 2 and 80 μm for Test Articles 3 and 4 were used in this case. Projection pressure was 2 kg/cm² for Test Articles 1 and 3 and 4 kg/cm² for Test Articles 2 and 4. Projection time was 15 seconds in all cases.

TABLE 5

| | | Test article 1 | Test article 2 | Test article 3 | Test article 4 |
|---|---|---|---|---|---|
| Conditions of projection | Projection material | Hard beads | | | |
| | Particle size of projection material (μm) | 40 | 40 | 80 | 80 |
| | Projection pressure (kg/cm²) | 2 | 4 | 2 | 4 |
| Depth of groove (μm) | | 0 | 0.1 | 0 | 0.1 |
| Roughness (μm) | | 0.2 | 0.2 | 0.4 | 0.4 |

Test Articles 5–8 were those which were processed by precision shot peening with silicon carbide (SiC) used as the projection material. Fabrication conditions for the test articles are shown in Table 6. Hard beads having a particle size of 40 μm for Test Articles 5 and 6 and 80 μm for Test Articles 7 and 8 were used in this case. Projection pressure was 2 kg/cm² for Test Articles 5 and 7 and 4 kg/cm² for Test Articles 6 and 8. Projection time was 20 seconds in all cases.

TABLE 6

| | | Test article 5 | Test article 6 | Test article 7 | Test article 8 |
|---|---|---|---|---|---|
| Conditions of projection | Projection material | Silicon carbide (SiC) | | | |
| | Particle size of projection material (μm) | 40 | 40 | 80 | 80 |
| | Projection pressure (kg/cm²) | 2 | 4 | 2 | 4 |
| Depth of groove (μm) | | 1 | 3 | 1 | 3 |
| Roughness (μm) | | 0.3 | 0.3 | 0.5 | 0.5 |

These Test Articles 1–8 are evaluated. First, with regard to the depth of formable grooves that differ from one another depending on the projection material, the depth of formable grooves was 0.1 μm in Test Articles 1–4 (hard beads), whereas grooves of 1–3 μm depths were able to be formed with Test Articles 5–8 (SiC). From this fact, it can be understood that hard beads are suited to form shallow grooves, and that silicon carbide (SiC) particles are suitable for the formation of the herringbone groove portions.

Figure 14:
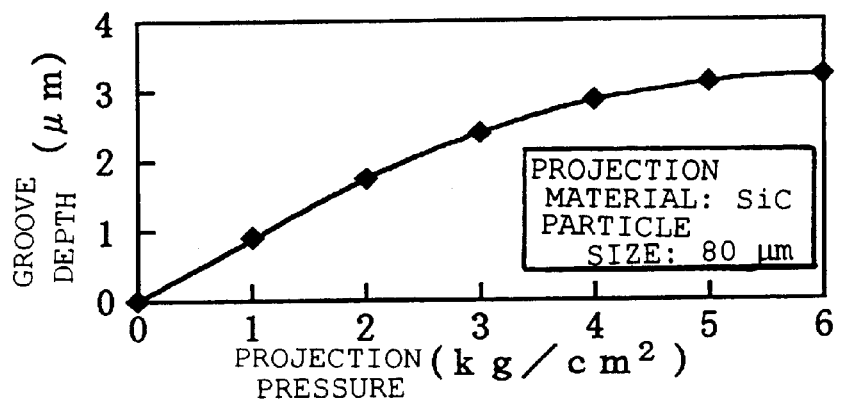
FIG. 14 is a chart showing the relationship between groove depth of herringbone groove portions formed in the examples of the invention and projection pressure used for the formation of the herringbone groove portions.

Next, FIG. 14 shows the relationship between projection pressure and groove depth in the case where silicon carbide having a particle size of 80 µm were used. In this graph, the abscissa represents projection pressure (kg/cm²) and the ordinate represents groove depth (µm). As can be seen from this graph, the depth of formed grooves increases with increasing projection pressure, but comes to a steady state when the projection pressure goes beyond 4 kg/cm². This fact implies that even if pressure higher than a certain value is applied, the resultant effect would remain almost unchanged. That is, in this case, a projection pressure of about 4 kg/cm² is optimal.

Figure 15:
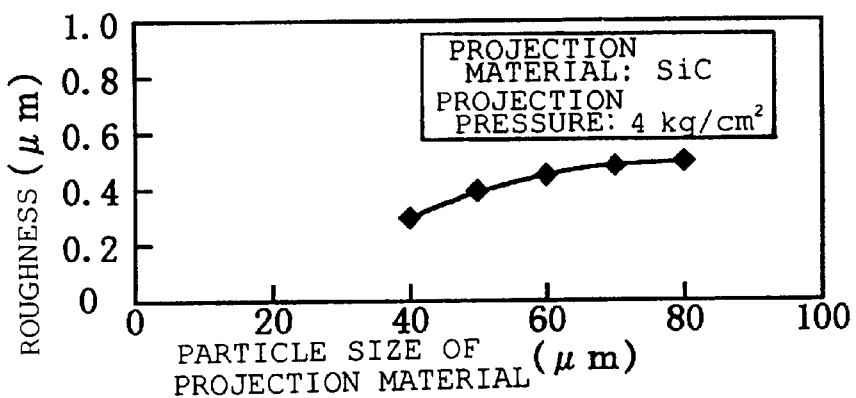
FIG. 15 is a chart showing the relationship between the roughness of herringbone groove portions formed in the examples of the invention and the particle size of projection material used for the formation of the herringbone groove portions.

Next, FIG. 15 shows the relationship between particle size and roughness of a projection material in the case where silicon carbide was used as the projection pressure and where the projection pressure was 4 kg/cm². In this graph, the abscissa represents particle size (µm) and the ordinate represents roughness (µm). As can be seen from this graph, the surface roughness of formed groove portions gently increases with increasing particle size of the projection material. Then, the roughness becomes generally constant after the particle size of the projection material goes beyond about 60 µm.

With respect to the roughness, smaller roughnesses are preferable in some cases, but in other cases, a certain level of roughness is required, for example, when metal or ceramic coating is formed on the surface by plasma spraying, thus the case being such that various surface roughnesses are required depending on the application. However, the groove forming method of the present invention is capable of forming required surface roughnesses by controlling the particle size of the projection material.

On the grounds described above, it has been found out that the method for forming herringbone groove portions of a dynamic-pressure bearing according to the present invention is capable of forming groove portions having specified groove depth and surface roughness by controlling the properties, particle size and projection pressure of the projection material. Then, a case where this method is applied to an actual dynamic-pressure bearing is described below.

Figure 16:
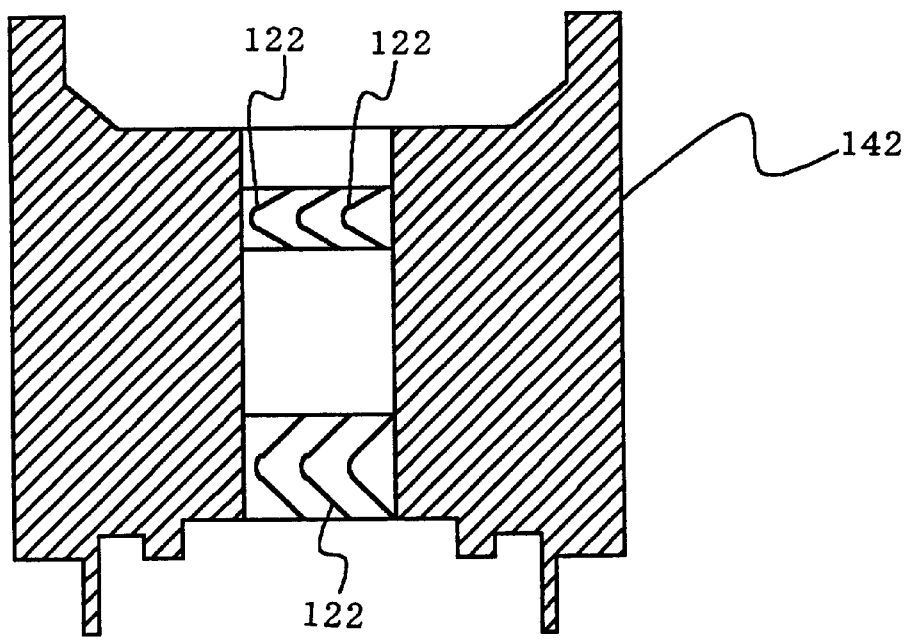
FIG. 16 is a view showing a bearing sleeve of a dynamic-pressure bearing to which the invention is applied.
Figure 17:
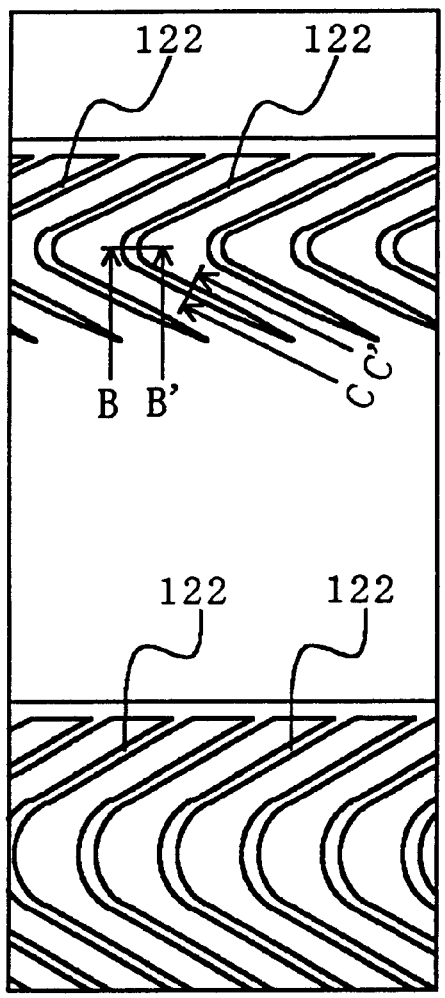
FIG. 17 is a view showing under magnification the herringbone groove portions of the bearing sleeve shown in FIG. 16.
Figure 18A:
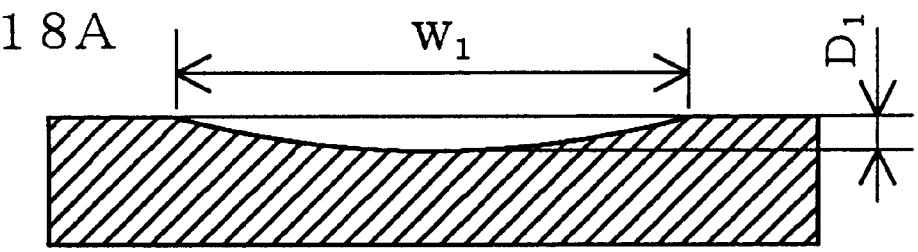
FIGS. 18A and 18B are views showing a section taken along the line BB' and a section taken along the line CC', respectively, of the herringbone groove portions shown in FIG. 17.
Figure 18B:
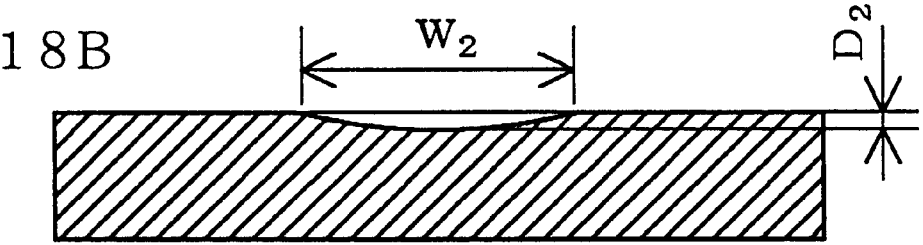

FIG. 16 shows an example in which herringbone groove portions 122, 122 . . . are formed in a bearing sleeve 142 of a dynamic-pressure bearing. FIG. 17 shows in magnification an inner diameter portion of the bearing sleeve 142 shown in FIG. 16, depicting the configuration of the V-shaped herringbone groove portions 122, 122 . . . Also, FIG. 18A shows a section taken along the line BB' of the herringbone groove portions shown in FIG. 17, and FIG. 18B shows a section taken along the line CC' of the same. Reference characters $W_1$ and $W_2$ denote widths of the respective groove portions, and $D_1$ and $D_2$ denote depths of the respective groove portions.

For the formation of these herringbone groove portions 122, 122 . . . , silicon carbide was used as the projection material, with a particle size of 80 µm and a projection pressure of 4 kg/cm², and it took 15 seconds for the formation. The herringbone groove portions 122, 122 . . . formed under these conditions showed values of $W_1$=200 µm, $D_1$=12.5 µm, $W_2$=106 µm and $D_2$=6.3 µm. Like this, not only the BB' section, which is a relatively coarse configuration, but also the CC' section, which has a fine configuration, can be formed as expected.

The method for forming herringbone groove portions of a dynamic-pressure bearing according to the present invention is not limited to the above-described examples, and various modifications and changes may be made without departing the spirit of the present invention. For example, although the above embodiments have been shown on a case where herringbone groove portion are formed on the bearing sleeve side, yet the present invention may be applied also to cases where herringbone groove portions are formed on the bearing shaft side.

Furthermore, by changing the conditions for the particle size and projection pressure of the projection material, dynamic-pressure generating grooves of various configurations and depths can be formed without being limited to V-shaped herringbone groove portions that have been shown in the examples.

Besides, although hard beads and silicon carbide have been used as the projection material in the above examples, various types of small-size particles of plastics, alumina and the like can be applied only if their particle size is within a range of 5–100 µm. Also, any equipment to be used for the formation of herringbone groove portions, only if capable of controlling such conditions as projection pressure, projection amount per unit time and projection aperture of the nozzle, can be applied without any limitations.

What is claimed is:

1. A bearing mechanism comprising:
   a first member of a shaft shape; and
   a second member which has an insertion hole for the first member to be inserted through, and which forms, between an inner surface of the insertion hole and an outer circumferential surface of the first member, a bearing gap of a specified extent filled with a fluid while permitting the first member to rotate about an axis relative to the second member,
   wherein in at least either one of the outer circumferential surface of the first member or an inner circumferential surface of the second member opposed thereto, dot-like minute dips and bumps are formed dispersedly, whereby the surface is roughened so that a center-line mean roughness of the surface is controlled within a range of 0.1 µm–1.0 µm, and wherein the first member and the second member are rotated relative to each other so that a radial dynamic pressure is generated around the first member in the bearing gap, and
   wherein given a radius r1 of the outer circumferential surface of the first member, a radius r2 of the inner circumferential surface of the second member and a cylindricity C of each surface, an expression that C≦(r2−r1)/2 is satisfied.

2. The bearing mechanism according to claim 1, wherein the fluid is a gas.

3. The bearing mechanism according to claim 1, wherein the fluid is a liquid.

4. The bearing mechanism according to claim 1, wherein the center-line mean roughness of at least one of the outer circumferential surface of the first member and the inner circumferential surface of the second member is controlled within a range of 0.15 µm–0.2 µm.

5. The bearing mechanism according to claim 1, wherein given a radius r1 of the columnar-shaped outer circumferential surface of the first member and a radius r2 of the columnar-shaped inner circumferential surface of the second member, r2−r1 is controlled within a range of 0.2–20 µm.

6. A polygon mirror drive mechanism comprising:
   the bearing mechanism as defined in claim 1;
   a driving section for, assuming that either one of the first member or the second member of the bearing mechanism is a fixed-side member and the other is a rotation-side member, driving the rotation-side member (hereinafter, referred to as rotating member) into rotation; and a polygon mirror which is integrated to the rotating member and which has a plurality of reflecting surfaces formed into a polyhedral shape so as to surround an axis of rotation of the rotating member.

7. The bearing mechanism according to claim 1, wherein dot-like minute dips and bumps are formed dispersedly in the outer circumferential surface of the first member, whereby the surface is roughened so that a center-line mean roughness Ra of the outer circumferential surface of the first member is controlled within a range of 0.1 μm–1.0 μm, while a center-line mean roughness Ra of the inner circumferential surface of the second member is controlled to 1.0 μm or less.

8. The bearing mechanism according to claim 1, wherein the first member has a rotation supporting portion which is formed so as to be in contact with a supported portion formed on the second member side, and which rotatably supports the second member while permitting the second member to move radially within a range of the bearing gap.

9. The bearing mechanism according to claim 1, wherein the dot-like minute dips and bumps are formed by projecting impact particles having a mean particle size controlled within a range of 5–100 μm at a rate of 50 m/sec–300 m/sec onto a dips-and-bumps formation surface portion where the dips and bumps are to be formed.

10. The bearing mechanism according to claim 9, wherein the dot-like minute dips and bumps are formed by using, as the impact particles, particles which are harder than a material from which the dips-and-bumps formation surface is formed.

11. The bearing mechanism according to claim 9, wherein the dot-like minute dips and bumps are formed by using spherical particles as the impact particles.

12. The bearing mechanism according to claim 9, wherein the dot-like minute dips and bumps are formed by iterating to a plurality of times the projection of the impact particles onto the dips-and-bumps formation surface portion.

13. The bearing mechanism according to claim 1, wherein groove portions which contribute to generation of the radial dynamic pressure are formed together with the dot-like minute dips and bumps in either one of the outer circumferential surface of the first member or the inner circumferential surface of the second member opposed thereto.

14. A hard disk drive mechanism comprising:

the bearing mechanism as defined in claim 1;

a driving section for, assuming that either one of the first member or the second member of the bearing mechanism is a fixed-side member and the other is a rotation-side member, driving the rotation-side member (hereinafter, referred to as rotating member) into rotation; and a hard disk which is fitted to the rotating member and which rotates integrally therewith.

* * * * *